(12) United States Patent
Franklin, III et al.

(10) Patent No.: US 6,824,092 B1
(45) Date of Patent: Nov. 30, 2004

(54) AIRCRAFT TAIL CONFIGURATION FOR SONIC BOOM REDUCTION

(75) Inventors: Walter M. Franklin, III, Canyon Country, CA (US); John M. Morgenstern, Lancaster, CA (US); Howard Lee, Monterey Park, CA (US); Brian Quayle, Lancaster, CA (US); Ken Hajic, Valencia, CA (US); John Scarcello, Fair Oaks Ranch, CA (US); Alan E. Arslan, Santa Clarita, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 0 days.

(21) Appl. No.: 10/696,795

(22) Filed: Oct. 30, 2003

(51) Int. Cl.[7] .............................................. B64C 5/02
(52) U.S. Cl. ........................ 244/1 N; 244/15; 244/130; 244/87; 244/45 R
(58) Field of Search .......................... 244/1 N, 15, 87, 244/88, 130, 45 R, 45 A, 73 R, 73 A

(56) References Cited

U.S. PATENT DOCUMENTS

| | | | | |
|---|---|---|---|---|
| 2,472,763 | A | * 6/1949 | Rodeck | 244/13 |
| 3,018,987 | A | * 1/1962 | Multhopp | 244/75 R |
| 3,026,065 | A | * 3/1962 | Holland, Jr. | 244/12.4 |
| 3,284,028 | A | * 11/1966 | Robertson | 244/15 |
| 4,161,300 | A | * 7/1979 | Schwaerzler et al. | 244/45 A |
| 4,290,612 | A | * 9/1981 | Frosch et al. | 277/345 |
| 4,351,502 | A | * 9/1982 | Statkus | 244/219 |
| 4,410,150 | A | 10/1983 | Lahti | |
| 4,427,168 | A | * 1/1984 | McKinney et al. | 244/214 |
| 4,445,655 | A | * 5/1984 | Hueberger | 244/214 |
| 4,449,683 | A | 5/1984 | Gratzer et al. | |
| 4,485,992 | A | * 12/1984 | Rao | 244/90 R |
| 4,489,905 | A | 12/1984 | Bengelink et al. | |
| 4,815,680 | A | 3/1989 | Goldhammer | |
| 4,848,700 | A | * 7/1989 | Lockheed | 244/45 A |
| 4,913,380 | A | * 4/1990 | Vardaman et al. | 244/135 R |
| 4,940,196 | A | 7/1990 | Lardellier | |
| 5,020,740 | A | * 6/1991 | Thomas | 244/93 |
| 5,482,228 | A | 1/1996 | Hoshino | |
| 5,524,847 | A | 6/1996 | Brodell et al. | |
| 5,653,406 | A | * 8/1997 | Amano et al. | |
| 5,681,013 | A | * 10/1997 | Rudolph | 244/214 |
| 5,692,703 | A | 12/1997 | Murphy et al. | |
| 5,927,656 | A | * 7/1999 | Hinkleman | 244/203 |
| 5,934,607 | A | 8/1999 | Rising et al. | |
| 6,015,117 | A | * 1/2000 | Broadbent | 244/214 |
| 6,273,364 | B1 | 8/2001 | Tizac et al. | |
| 6,279,853 | B1 | 8/2001 | Brighton | |
| 6,293,497 | B1 | * 9/2001 | Kelley-Wickemeyer et al. | 244/130 |
| 6,340,134 | B1 | 1/2002 | Meschino | |
| 6,481,668 | B2 | 11/2002 | Grossman | |
| 6,575,406 | B2 | * 6/2003 | Nelson | 244/119 |

* cited by examiner

Primary Examiner—Galen Barefoot
(74) Attorney, Agent, or Firm—Koestner Bertani LLP; Ken J. Koestner

(57) ABSTRACT

A supersonic aircraft comprises a wing having upper and lower surfaces and extending from a leading edge to a trailing edge and at least two engine nacelles coupled to the lower surface of the wing on the trailing edge. The supersonic aircraft further comprises an inverted V-tail abutting to the upper side of the wing comprising a central vertical stabilizer, at least two inverted stabilizers coupled to sides of the central vertical stabilizer and coupled to the wing and supporting at least two engine nacelles, and at least two ruddervators respectively pivotally coupled to at least two inverted stabilizers. The supersonic aircraft also comprises a controller coupled to at least two ruddervators and capable of adjusting the aircraft longitudinal lift distribution throughout a flight envelope to maintain a reduced sonic boom and reduced drag trim condition.

20 Claims, 24 Drawing Sheets

AIRCRAFT TAIL CONFIGURATION FOR SONIC BOOM REDUCTION

BACKGROUND OF THE INVENTION

Supersonic flight over the United States and other countries is a challenging environmental issue for a viable supersonic commercial aircraft. Current FAA regulations prohibit civil flights at Mach numbers greater than one without case-by-case exceptions approved by the Administrator. Many other countries have similar restrictions.

Previous research has shown that the highly impulsive nature of the "N-wave" sonic-boom signatures of all existing supersonic aircraft is the primary cause of negative response and regulatory limitations on supersonic travel. Conclusions of NASA research further indicate the exceptional difficulty of designing an aircraft with an "N-wave" signature of sufficiently low amplitude for general public acceptance. However, the research also found that a "shaped" signature was less objectionable and that a reasonably achievable amplitude wave could meet Committee on Hearing and Bioacoustics of the National Research Council (CHABA) guideline for acceptable noise impact to the general public, depending on frequency of exposure.

A sonic boom occurs due to pressure waves that occur when an aircraft moves at supersonic speeds. During subsonic flight, air displaced by a passing plane flows around the plane in the manner water flows around an object in a stream. However, for a plane flying at supersonic speeds, the air cannot easily flow around the plane and is instead compressed, generating a pressure pulse through the atmosphere. The pressure pulse intensity decreases as a consequence of movement from the airplane, and changes shape into an N-shaped wave within which pressure raises sharply, gradually declines, then rapidly returns to ambient atmospheric pressure. A wall of compressed air that moves at airplane speed spreads from the wave and, in passing over ground, is heard and felt as a sonic boom. The rapid changes in pressure at the beginning and end of the N-wave produce the signature double bang of the sonic boom.

Research has recently shown that boom intensity can be reduced by altering aircraft shape, size, and weight. For example, small airplanes create a smaller amplitude boom due to a lower amount of air displacement. Similarly, a lighter aircraft produces a smaller boom since an airplane rests on a column of compressed air and a lighter plane generates a lower pressure column. An aircraft that is long in proportion to weight spreads the N-wave across a greater distance, resulting in a lower peak pressure. Furthermore, wings that are spread along the body and not concentrated in the center as in a conventional aircraft produces a pressure pulse that is similarly spread, resulting in a smaller sonic boom.

Shaping of a sonic boom refers to a technique of altering source pressure disturbance such that a non-N-wave shape is imposed on the ground. Shaping sonic boom can reduce loudness by 15–20 dB or higher with no added energy beyond that to sustain flight. Shaping to minimize loudness is based on insight regarding changes in aircraft pressure disturbances during propagation to the ground.

Shaped sonic booms are only achieved deliberately. No existing aircraft creates a shaped sonic boom that persists for more than a fraction of the distance to the ground while flying at an efficient cruise altitude since non-shaped pressure distributions quickly coalesce into the fundamental N-wave shape. The N-wave form generates the largest possible shock magnitude from a particular disturbance. The N-wave shape results because the front of a supersonic aircraft generates an increase in ambient pressure while the rear generates a decrease in pressure. Variation in propagation speed stretches the disturbance during propagation to the ground. Shaped boom techniques typically attempt to prevent coalescing of the pressure disturbance by adding a large compression at the aircraft nose and an expansion at the tail with pressure in between constrained between the compression and expansion. The shaped boom stretches the ends of the signature faster than the in-between pressures, creating a non-N-wave sonic boom at the ground.

Boom reduction makes a supersonic aircraft less objectionable by minimizing the loudness of a sonic boom. Audible frequencies in a sonic boom occur in the rapid pressure changes, or shocks, at the beginning and end of the typical N-waveform. More quiet shocks have decreased pressure amplitudes and increased pressure change time durations.

Although sonic boom reduction is an important design criterion for a supersonic aircraft, other considerations always impact design decisions. For example, a useful aircraft will have an appropriate capacity for holding passengers and/or cargo and be a suitable configuration for safe operation. Some design aspects include integration of landing gear and airframe.

SUMMARY OF THE INVENTION

What is desired is a supersonic aircraft with tail and control structures that effectively control the aircraft in subsonic, transonic, and supersonic flight, and enable sonic boom reduction or minimization.

In accordance with some embodiments of the disclosed aeronautical system, a supersonic aircraft comprises a wing having upper and lower surfaces and extending from a leading edge to a trailing edge and at least two engine nacelles coupled to the lower surface of the wing on the trailing edge. The supersonic aircraft further comprises an inverted V-tail coupled to the wing comprising a central vertical stabilizer, at least two inverted stabilizers coupled to sides of the central vertical stabilizer and coupled to the wing and supporting at least two engine nacelles, and at least two ruddervators respectively pivotally coupled to at least two inverted stabilizers. The supersonic aircraft also comprises a controller coupled to at least two ruddervators and capable of adjusting the aircraft longitudinal lift distribution throughout a flight envelope to maintain a reduced sonic boom and reduced drag trim condition.

According to other embodiments, a supersonic aircraft comprises a wing having upper and lower surfaces and extending forward from a leading edge aft to a trailing edge, and an inverted V-tail coupled to the wing comprising a central vertical stabilizer with leading and trailing edges, and at least two inverted stabilizers coupled to sides of the central vertical stabilizer and coupled to the wing. The aircraft further comprises a rudder pivotally mounted on the trailing edge of the central vertical stabilizer. The rudder has a sufficient area and rudder control sizing to enable adequate yaw acceleration to achieve at least 8 degrees of yaw angle change within four seconds for decrab and a rudder actuator rate less than 60 degrees/second.

In accordance with other embodiments, a supersonic aircraft comprises a fuselage extending forward and aft about a longitudinal axis. The fuselage has upper and lower surfaces. The lower surface has a general axial curvature about the longitudinal axis and a local aft flattening. The aft flattening of the fuselage adds lateral stiffening to the aircraft structure. The aircraft further comprises a wing coupled inboard to the fuselage and extending outboard, and having a forward leading edge to an aft trailing edge. The aircraft also comprises an inverted V-tail coupled to the wing and fuselage comprising a central vertical stabilizer, at least two inverted stabilizers coupled to sides of the central vertical stabilizer and to the wing outboard of the fuselage. Furthermore, the aircraft comprises a strake coupled to and extending from the central vertical stabilizer through the fuselage interior and coupling to the lower fuselage surface at the position of local aft flattening.

According to further additional embodiments, a supersonic aircraft comprises a wing having upper and lower surfaces and extending from a leading edge to a trailing edge, at least two engine nacelles coupled to the lower surface of the wing on the trailing edge, and an inverted V-tail coupled to the wing. The inverted V-tail comprises a central vertical stabilizer, at least two inverted stabilizers coupled to sides of the central vertical stabilizer and coupled to the wing and supporting at least two engine nacelles. The aircraft further comprises at least two wing structural support members coupled to the upper surface of the wing generally overlying at least two engine nacelles. The wing structural support members couple between the inverted stabilizers and the wing and extend from the wing trailing edge forward. The structural support members add support to assist carrying engine nacelles weight.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1A:
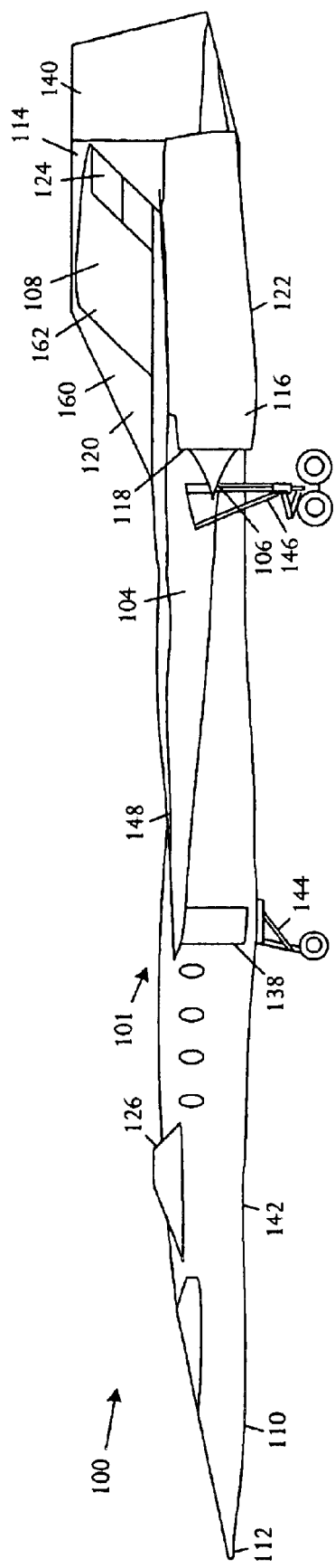
FIGS. 1A, 1B, and 1C are schematic pictorial diagrams respectively showing side, front, and top views of a supersonic aircraft with an inverted V-tail configuration.
Figure 1B:
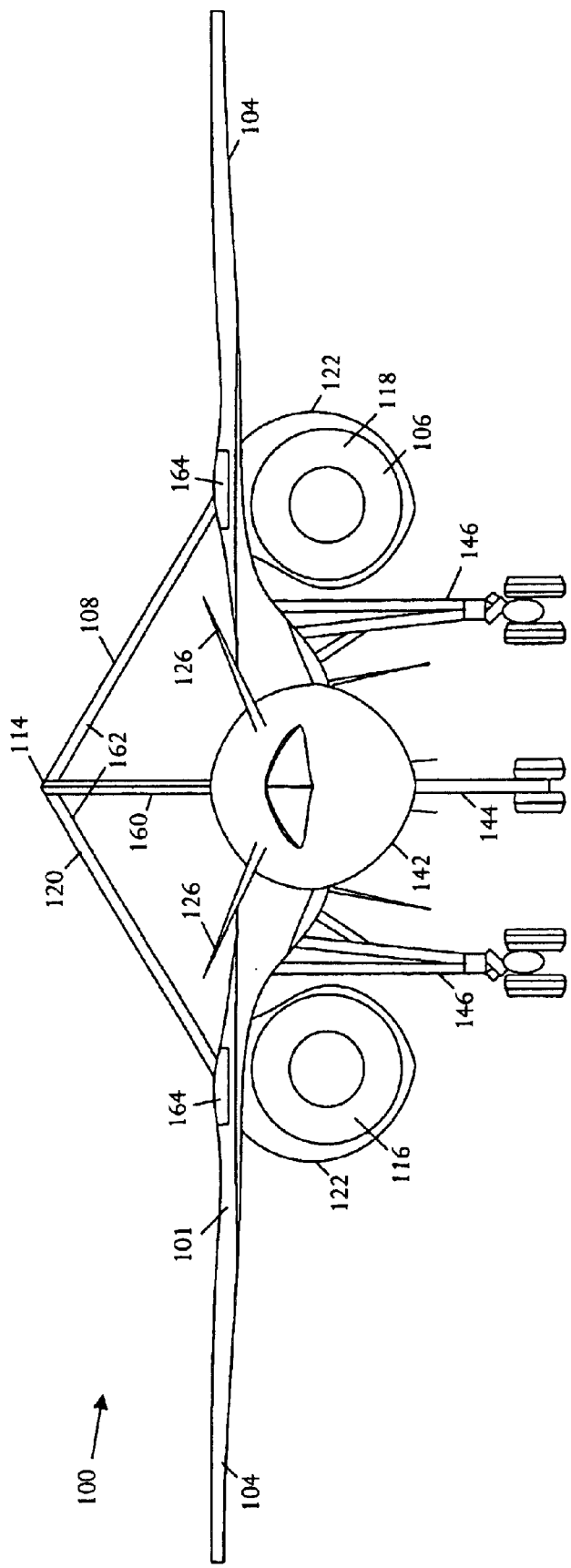
Figure 1C:
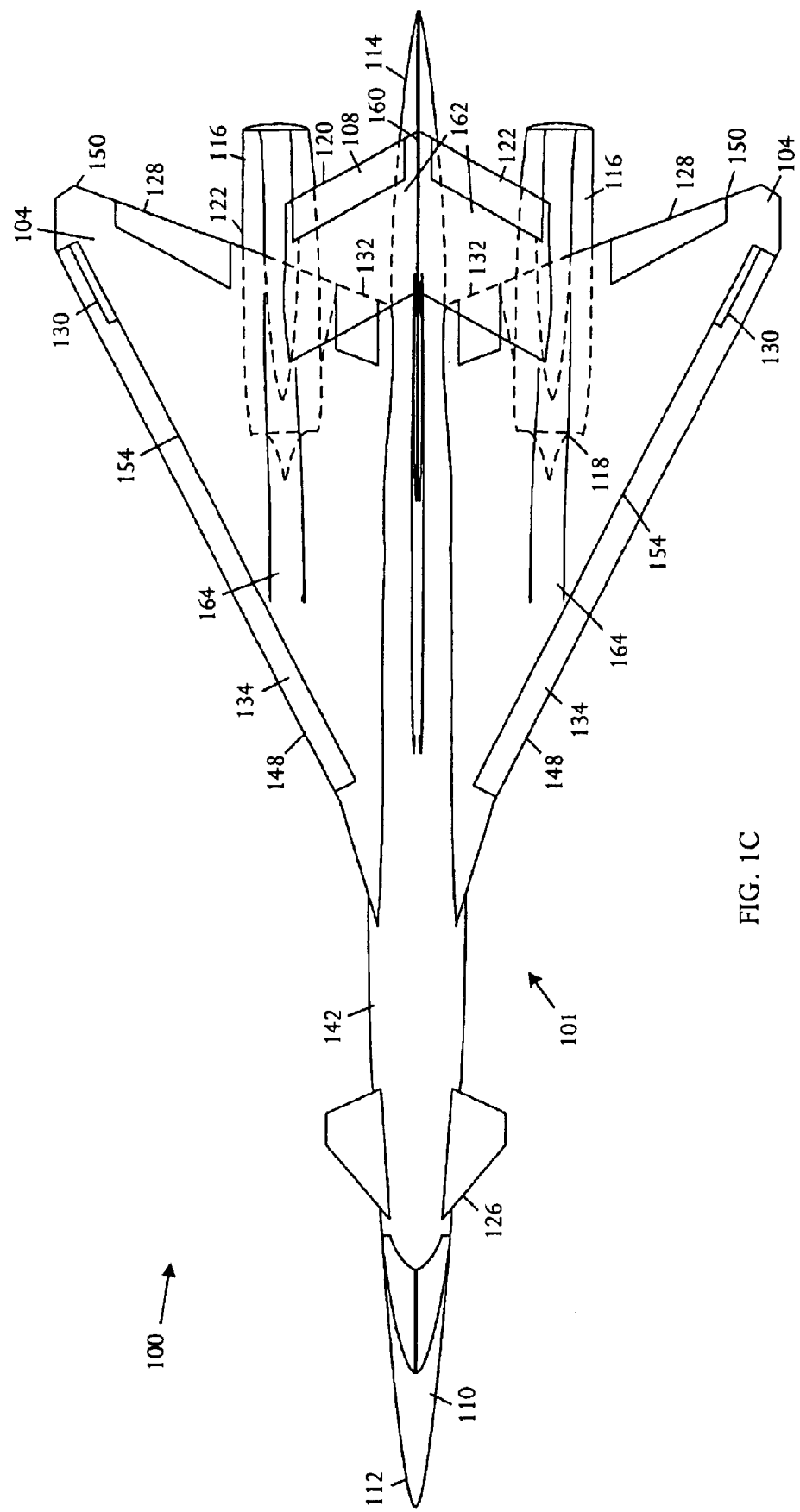

Referring to FIGS. 1A, 1B, and 1C, schematic pictorial diagrams respectively showing side, front, and top views of an embodiment of a supersonic aircraft 100 with an inverted V-tail configuration 108. The aircraft 100 comprises a wing 101 formed of a wing 104 and fuselage 142 and having upper and lower surfaces and extending from a leading edge 148 to a trailing edge 150. The aircraft 100 further comprises at least two engine nacelles 122 coupled to the lower surface of the wing 101 on the trailing edge 150, and an inverted V-tail 108 coupled to the wing 101. The inverted V-tail 108 comprises a central vertical stabilizer 160, inverted stabilizers 162 coupled to sides of the central vertical stabilizer 160 and coupled to the wing 101 and supporting at least two engine nacelles 122. The aircraft 100 further comprises at least two wing structural support members 164 coupled to the upper surface of the wing 101 generally overlying at least two engine nacelles 122. The wing structural support members 166 couple between the inverted stabilizers and the wing 101 and extend from the wing trailing edge 150 forward. The structural support members 166 add support to assist carrying weight of the engine nacelles 122.

The wing structural support member 164 can be configured as a spine or support attached to the top of the wing as a protrusion forward of the inverted-V tail 108. The wing structural support member 164 generally extends a portion of the distance to the leading edge. The wing structural support member 164 may also be termed a "chunnel." The chunnel can be configured to reduce or minimize aerodynamic wave drag.

In the illustrative embodiment, the inverted V-tail 108 is integrated into the wing trailing edge 150. The wing 104 has a gull or dihedral 152 inboard of the engine nacelles 122. The dihedral 152 is configured in a manner sufficient to increase take-off roll at the fuselage tip 114 and to extend lifting length and reduce sonic boom effects.

The illustrative aircraft 100 has two main landing gear 146 coupled to a lower surface of the wing 104 respectively inboard of the engine nacelles 122. The main landing gear 146 retract into the wing 104 and fuselage 142. The wing inboard portion is configured to integrate with the nacelle 122 and forms the dihedral gull 152 that enhances low-sonic-boom signature by vertically staggering wing longitudinal lift distribution. The dihedral gull 152 is formed by twisting and cambering the wing 104 for low sonic boom and low induced drag while preserving a tailored local wing contour at a location of main landing gear retraction.

In some examples, the illustrative aircraft arrangement 100 has twin non-afterburning turbofan engines 116 set below and behind the wing 104. The non-afterburning turbofan engines 116 operate behind simple fixed-geometry axisymmetric external compression inlets 118. Considerations of community noise and takeoff, transonic, and cruise thrust specifications determine engine cycle selection and engine sizing. Nacelles 122 enclose the engines 116 and are coupled to lower surface the wings 104 at the wing trailing edge 150.

The shaping of the supersonic aircraft 100 including aspects of the wing 104, the tail assembly or empennage 120, and the integration of wing, nacelle, and landing gear are adapted according to sonic boom signature and supersonic cruise drag considerations. The empennage or tail system 120 includes stabilizers, elevators, and rudders in the inverted V-tail geometry 108. The inverted V-tail geometry 108 supports nacelles 122 in highly suitable positions relative to the wing 104 to suppress boom, and trims the supersonic aircraft 100 in cruise to attain an improved low-boom lift distribution. Panels of the inverted V-tail 108 support the nacelles 122 and non-afterburning turbofan engines 116 in combination with support of the wing 104 to handle flutter. Inverted V-tail control surfaces, termed ruddervators 124, adjust aircraft longitudinal lift distribution throughout the flight envelope to maintain a low boom, low drag trim condition.

In the illustrative embodiment, the aircraft wings 104, empennage, and propulsion system integration can be configured for reduced sonic boom signature and supersonic cruise drag. The aircraft 100 further includes an inverted V-tail geometry that reduces boom amplitude, supports engine nacelles 122 in appropriate positions relative to the wings 104, and facilitates aircraft trimming in cruise to attain an optimum low-boom lift distribution. Usage of the V-tail geometry to supplement the wings' support of the engine nacelles improves flutter performance.

Inverted V-tail control surfaces 124, termed "ruddervators," adjust aircraft longitudinal lift distribution throughout the flight envelope to maintain a low boom, low drag trim condition. The wings 104 have a substantial dihedral, or "gulling", incorporated into the wing inboard of the engines 116, a geometry that is most pronounced at the wing trailing edge. The gull 152 is produced by twisting and cambering the wing to produce low-boom and low induced drag while preserving a tailored local wing contour at the location of main landing gear retraction.

In some embodiments, the wing leading edge 148 has a substantially straight geometry to accommodate a simple hinge line 154 for a Krueger flap 134 that extends for the full length of the wings 104. The inboard wing integrates with the nacelle and diverter geometry, and follows the fuselage contour with a substantially normal intersection to reduce interference drag. An inboard wing flap hinge line is fully contained within the wing contour with upper and lower wing surfaces configured as planar as possible to facilitate low speed aerodynamic performance.

The wing gull 152 raises the engines 116 to increase available tip-back angle and reduce thrust-induced pitching moments. The wing gull 152 lowers the aircraft body to reduce the cabin door height above the ground and reduce entry stair length. The low fuselage 142 sets a low aircraft center of gravity, reducing tip-over angle and promoting ground stability. The gull 152 tends to "wrap" the wing around the nacelle 122, enhancing favorable interference between the inlets 118 and the wings 104, so that the resulting wing/body/nacelle geometry facilitates successful ditching and gear-up landings. In addition, the wing gull 152 enhances the aircraft low-boom signature by vertically staggering the longitudinal lift distribution of the wings 104. Favorable interference may also be achieved by wave cancellation or induced drag reduction due to nacelle lift.

In some embodiments, the supersonic aircraft 100 can include a canard 126 that operates primarily as a longitudinal power control device, particularly effectively during takeoff and in high-speed flight. The canard 126 also functions to fine tune the aircraft longitudinal trim condition. The canard 126 augments rudder operation by supplying yaw control power when left and right canard surfaces are deflected differentially.

The supersonic aircraft 100 includes segmented ailerons 128 that supply roll control power and automatic wing camber control to improve lift and drag conditions through the flight envelope. High-speed spoilers 130 supplement aileron roll power at transonic and supersonic speeds where Mach and aeroelastic effects reduce aileron effectiveness. The supersonic aircraft 100 has a high lift system including an inboard trailing edge flap 132 and a full-wingspan leading edge Krueger flap 134.

The supersonic aircraft 100 has multiple stability and control effectors. The canard 126 and symmetric deflections of the ruddervators 124 control pitch power. A vertical rudder 140 controls yaw. Inboard, midboard and outboard ailerons 128, and the high speed roll spoilers 130 control roll. The roll spoilers 130 are configured to control roll at supersonic Mach numbers. In an illustrative embodiment, trailing edge (TE) flaps 136 are deployed 30° down to generate additional lift during landing. TE flap deployment reduces angle-of-attack specifications by approximately 2° during landing. During second-segment climb, the TE flaps 136 are extended 10° to improve the lift-to-drag ratio for better climb performance. In addition, trailing edge flaps 132 can be used in conjunction with ailerons 128 for drag reduction at transonic conditions.

Leading edge (LE) Krueger flaps 134 are extended 130° for low speed operations including takeoff, approach and landing. The LE Krueger flaps 134 improve lift-to-drag ratio by 1.5, resulting in better climb performance that facilitates second-segment climb in case of engine malfunction.

The supersonic aircraft 100 includes multiple control surfaces, for example the ruddervators 124 inboard and outboard design, to enable continued operation and landing following single actuator failure or a single control surface jamming. Differential canard deflection can generate a yawing moment to counter a jammed rudder. Ailerons 128 and ruddervators 124 include multiple surfaces, increasing fault tolerant capability and supplying redundant elements for improved reliability.

The supersonic aircraft 100 has a fuselage 142 with a geometry configured to address multiple different objectives. The basic fuselage camber line and volume distribution address suitable crew vision concerns. The fuselage 142 is shaped to enable a level cabin floor with near-constant cabin height and a close-to-the-ground cabin door 138 with a relatively short entry stairway. The fuselage 142 has an internal volume suitable to contain multiple subsystems and a suitable amount of fuel in the body to attain an extended range. The fuselage shape integrates well with the wing 104 and empennage 120, with the entire aircraft configuration being conducive to attaining a low-boom signature and supersonic cruise drag levels. The supersonic aircraft 100 has a relatively short nose landing gear 144 and a main landing gear 146 that stow in a compact stowage volume. The wing 104 and/or fuselage 142 form a wing having aerodynamic characteristics appropriate for low-boom supersonic and transonic flight.

In some embodiments, the aircraft 100 can have a blunted nose 110 with or without a conical tip 112 and an inverted V-tail surface 108 that overlaps the wing 104, features that facilitate low-sonic-boom aircraft performance. The configuration suppresses features of a sonic boom pressure waveform that otherwise would make the boom sound level unacceptable. The supersonic aircraft 100 creates an N-shaped pressure wave caused by overpressure at the nose 110 and underpressure at the tail 114. Pressure rises rapidly at the nose 110, declines to an underpressure condition at the tail 114, and then returns to ambient pressure. Rapid pressure rises at the front and rear of the pressure wave producing the characteristic double explosion of the sonic boom.

The conical tip 112 of the nose 110 can be configured to create a pressure spike ahead of the aircraft forward shock, raising local temperature and sound velocity, thereby extending the forward shock and slowing the pressure rise. The supersonic aircraft 100 has a sharply swept arrow wing configuration 104 that reduces peak overpressure in the wave by spreading wing lift along the aircraft length. The wing configuration 104 has reduced wing leading and trailing edge sweeps. The inverted V-tail 108 can generate additional lift near the tail to improve aerodynamics and reduce boom.

Figure 2A:
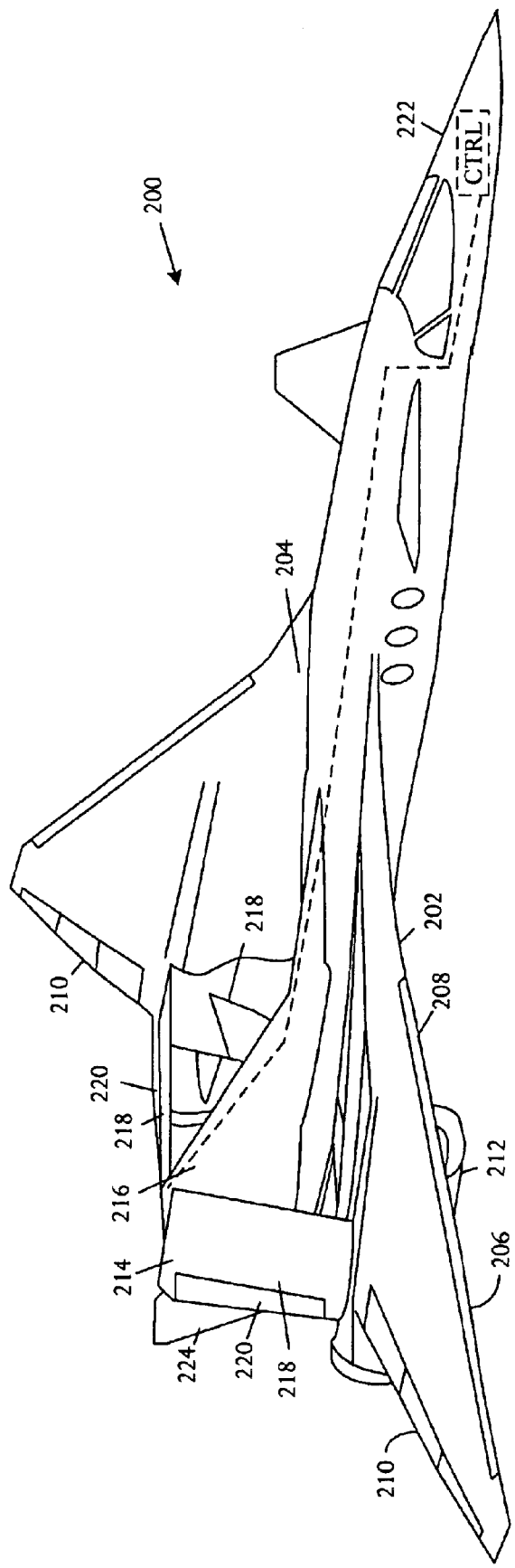
FIGS. 2A and 2B are perspective top and bottom pictorial views, respectively, showing an embodiment of a supersonic aircraft capable of adjusting the aircraft lift distribution to maintain reduced drag trim and reduced or minimized sonic boom.
Figure 2B:
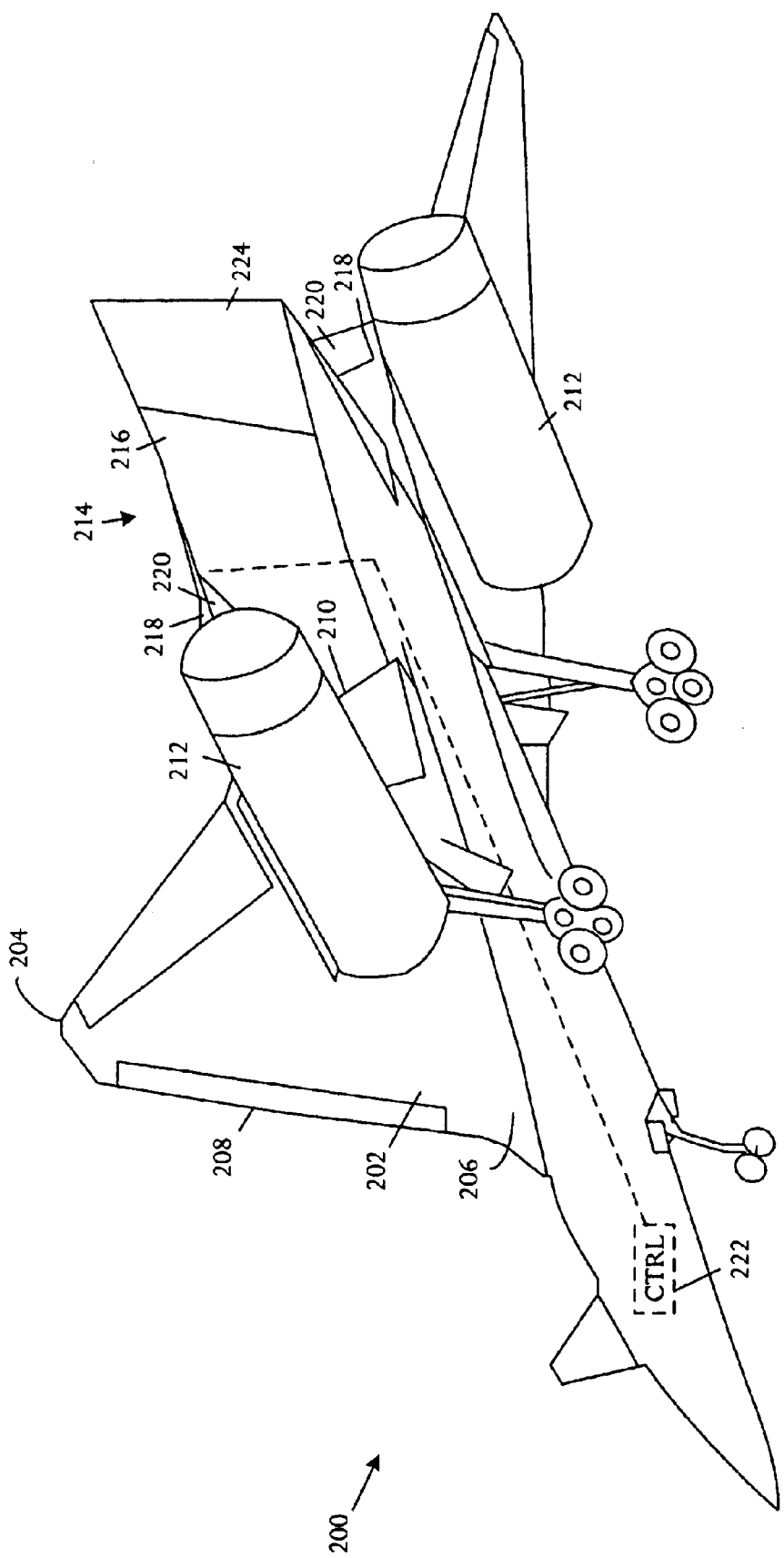

Referring to FIGS. 2A and 2B, perspective top and bottom pictorial views, respectively, of an embodiment of a supersonic aircraft 200 capable of adjusting the aircraft lift distribution to maintain reduced drag trim and reduced or minimized sonic boom. The supersonic aircraft 200 comprises a wing 202 that extends from a leading edge 208 to a trailing edge 210. The illustrative aircraft 200 has two engine nacelles 212 attached to the lower surface 206 of the wing 202 on the trailing edge 210. The aircraft also includes an inverted V-tail 214 attached to the wing 202. The inverted V-tail 214 has a central vertical stabilizer 216, inverted stabilizers 218 coupled to sides of the central vertical stabilizer 216 and also coupled to the wing 202. The inverted stabilizers 218 and assist the wing 202 in supporting the engine nacelles 212. The inverted V-tail 214 also includes ruddervators 220 that are pivotally coupled to the inverted stabilizers 218.

The aircraft 200 further comprises a controller 222 that is communicatively coupled to the ruddervators 220 and can adjust the aircraft longitudinal lift distribution throughout a flight envelope to maintain a reduced sonic boom and reduced drag trim condition. Generally, the controller 222 controls the ruddervators 230 to move up and down together for longitudinal control. The controller 222 can also control asymmetric deflection of the ruddervators for roll control in synchronization with the rudder 224 for directional control.

The ruddervators 220 can be configured with sufficient torsional stiffness to reduce or minimize flutter resulting from ruddervator rotation coupling with V-tail bending and torsion.

The inverted V-tail geometry is useful for overall low-sonic boom performance. The ruddervators 220, inverted V-tail control surfaces, adjust aircraft longitudinal lift distribution throughout the flight envelope to maintain a low boom, low drag trim condition.

Ruddervators 220 have appropriate actuator stiffness and ruddervator torsional stiffness, along with a V-tail mass distribution controlled using ballast weight to manage ruddervator rotation coupling with V-tail bending and torsion.

The ruddervators 220 can be symmetrically deflected in combination with the canards to supply pitch control power. The vertical rudder 224 supplies yaw control with roll control supplied by inboard, outboard, and midboard ailerons, and high speed roll spoilers.

In an illustrative embodiment, the ruddervators 220 effectively control pitch using maximum deflections of ±30 degrees for low speeds, and ±10 degrees for high speeds. With 10 degrees deflection, the ruddervator effectiveness reduces as Mach number is increased beyond 0.9. The ruddervator may be less effective in the higher Mach numbers. Loss of effectiveness as Mach number approaches supersonic speed is common for trailing edge control devices. Flexible effects due to structural bending also contributed to the loss of ruddervator control effectiveness at high dynamic pressure conditions. The ruddervator 220 is an effective pitch control device at the subsonic speeds, providing approximately the same pitch control capability as the canard.

Optimal trimming surfaces may be a combination of both the canard and the ruddervator based on the least impact to trim drag increment.

Figure 3:
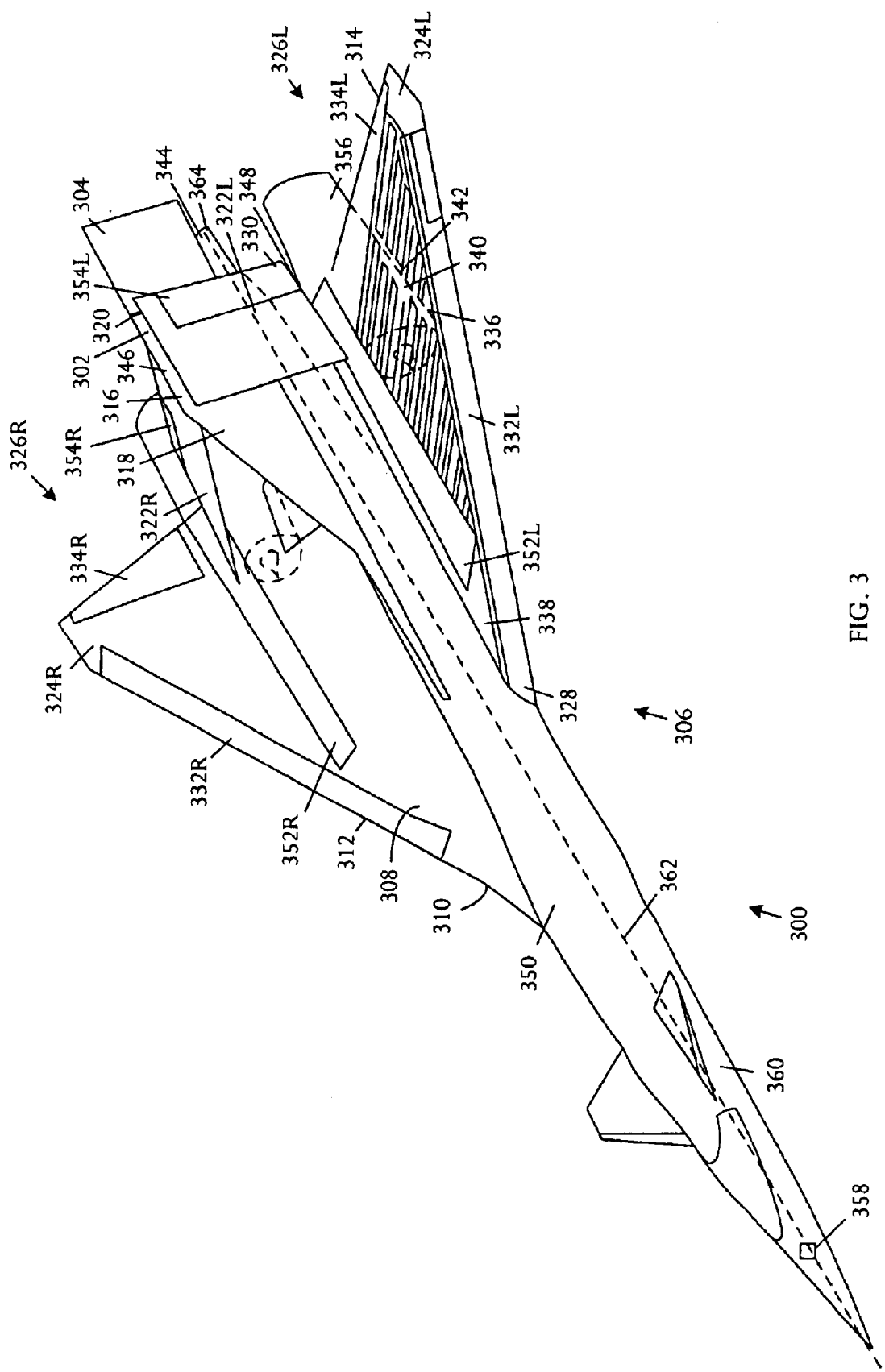
FIG. 3 is a schematic pictorial structural diagram illustrating an example of a supersonic aircraft with an inverted V-tail structure and relatively large rudder in proportion to the tail.

Referring to FIG. 3, a schematic pictorial structural diagram illustrates an example of a supersonic aircraft 300 with an inverted V-tail structure 302 and relatively large rudder 304 in proportion to the tail 302. The aircraft 300 comprises a wing 306 having upper 308 and lower 310 surfaces and extending forward from a leading edge 312 aft to a trailing edge 314. The aircraft 30 further comprises the inverted V-tail 304 coupled to the wing 306 that has a central vertical stabilizer 316 with leading 318 and trailing 320 edges, and inverted stabilizers 322L,R coupled to sides of the central vertical stabilizer 316 and coupled to the wing 306. The rudder 304 is pivotally mounted on the trailing edge 320 of the central vertical stabilizer 316. The rudder 304 has a relatively large size in proportion to the central vertical stabilizer 316. Specifically, the rudder 304 has a sufficient area and rudder control sizing to enable adequate yaw acceleration to achieve at least 8 degrees of yaw angle change within four seconds for decrab and a rudder actuator rate less than 60 degrees/second.

In some embodiments, the rudder 304 has an area that is greater than 60% of the area of the central vertical stabilizer 316, an appropriate rudder area and rudder control sizing to counteract asymmetric engine thrust in the event of a single engine failure.

In some embodiments, the rudder 304 has a sufficient area and rudder control sizing to attain a minimum control speed in air (Vmca) of approximately 165 knots. Vmca is defined as the speed at which the rudder is adequate to counteract asymmetric engine thrust with a bank angle less than or equal to 5 degrees.

In some embodiments, the rudder 304 is sufficiently large and the inverted V-tail 302 is configured at a position sufficiently aft with respect to the aircraft 300 to attain rudder yaw control for single engine failures.

The supersonic aircraft 300 includes a left 324L and right 324R wing sections respectively attached to the left 326L and right 326R sides of a center body/inboard wing section 328 and a lower part 330 of the left 322L and right 322R inverted stabilizers. Left 332L and right 322R leading edge flaps and left 334L and right 334R ailerons are attached to the left 324L and right 324R wing section forward spars 336. Wing skins 338 have integral stiffeners 340 machined in a panel 342 that runs between the wing spars 336L,R.

The inverted V-tail structure 302 includes three sections, a tail structure section 344, a vertical stabilizer to inverted stabilizer joint section 346, and inverted stabilizer to nacelle joint section 348. The vertical stabilizer 316 is attached to the top of the center body and aft body section 350. The top of the vertical stabilizer 316 is attached to the top of left 322L and right 322R inverted stabilizers. The lower end of left inverted stabilizer 322L is attached to the surface of a left wing or wing structural support member 352L, which may otherwise be termed a torque box, torsion box, or similar terminology. Left 354L and right 354R ruddervators are respectively attached to the aft of the left 322L and right 322R inverted stabilizers. The rudder 304 is pivotally attached to the end of the vertical stabilizer 316.

The illustrative embodiment of the aircraft 300 further comprises engine nacelles 356 coupled to the lower surface of the wing 306 on the wing trailing edge 314. In some embodiments, the aircraft further includes a controller 358 coupled to the ruddervators 354L, R. The controller 358 can control the ruddervators 354L, R to adjust yaw axis using sideslip command control law, and roll axis using sideslip command control law. In the yaw axis, pilot pedal input is interpreted as sideslip angle demand and pilot roll stick input is interpreted as roll rate demand.

The aircraft 300 also comprises a fuselage 360 merged with the wing 306 and extending forward and aft along a longitudinal axis 362. The aft portion of the fuselage 360 forms a fuselage tail cone 364. In the illustrative embodiment, the rudder 304 is merged with the fuselage tail cone 364 so that the rudder and tail cone rotate pivotally with respect to the central vertical stabilizer 316 and the fuselage 360.

Single engine failure minimums control speeds are used for rudder control sizing. Rudder control sizing is designed based on single engine failure analysis so that yaw control is adequate to maintain control of directional flight path angle. Control sizing is sufficient to yaw the aircraft into the direction of the operative engine, and the direction of the inoperative engine. For example in a 25 knots crosswind landing, the rudder can be designed to supply adequate yaw acceleration to achieve 8.5 degrees of yaw angle change within 3 seconds for decrab.

In another example, the rudder can be sized based on analysis of minimum control speed on the ground (Vmcg) with one engine failure during takeoff. The rudder size and rudder control can be sized to supply adequate control margin for single engine failure during takeoff on the ground according to Vmcg, minimum controlled ground speed. At Vmcg, lateral deviation from runway centering is constrained to less than 30 feet. Aerodynamic moments balance engine thrust with one engine out and creating windmilling drag, and the other engine at max thrust plus a thrust bump for a "hot" engine. Moment balance can be done about the aircraft center of gravity considering main gear reactions caused by rudder sideforce.

In other embodiments, moment is balanced about the main gear center, which lies in line with the gear and halfway equidistant between the gear. Engine thrust imbalance is controllable with full rudder deflection. Vmcg, primarily a balance of engine thrust imbalance with the rudder, is relatively independent of flap setting or aircraft weight.

The vertical rudder is sized to counteract the asymmetric engine thrust in the event of single-engine failure. The resultant side force generated by deflecting the rudder causes the aircraft to deviate directionally from the intended course. Rudder side force is countered by the gravity force generated by banking the vehicle. A maximum bank angle limit of 5 degrees is imposed by FAA for certification demonstration. In the condition where 5 degrees bank is inadequate to counteract the aerosurface side force, steady sideslip can be used. The direction of steady sideslip, however, creates additional yawing moment in the direction of the operative engine that increases sizing requirements of the rudder. When 5 degrees bank angle generates more than enough counteractive side force, steady sideslip generates yawing moment in the direction that reduces the appropriate rudder deflection.

Minimum control speed in the air (Vmca) is determined with the aircraft at maximum sea level takeoff thrust, maximum takeoff gross weight, takeoff flap configuration, gears up, and with one engine failed. Vmca is the minimum airspeed at which the rudder is adequate to counteract the asymmetric engine thrust with bank angle less than or equals to 5 degrees.

Minimum control speed during approach and landing (Vmcl) is the minimum calibrated airspeed at which the vehicle is controllable with one engine failed and the operative engine is set at the go-around power. Vmcl must be less than or equal to the approach speed (Vapp) and is determined with the aircraft in the landing configuration. The aircraft is designed to have adequate rudder and aileron control power to handle single engine failure for go-around with the vehicle in the landing configuration.

Furthermore, the rudder is sized to maintain directional and lateral control of the aircraft following a single engine failure for the entire flight envelope. Adequate yaw and roll control power is made available throughout the operational flight envelope to maintain a given course, with the remaining engine at maximum continuous power and bank angle less than 5 deg.

The illustrative aircraft is designed with the empennage positioned sufficiently aft to increase the moment arm and the rudder area is configured to a relatively large size. In addition, some embodiments utilize a high speed roll spoiler to increase the roll controllability of the vehicle for supersonic conditions. The spoiler is scheduled with the ailerons on the opposite wing for best performance.

A leading edge flap, either a simple flap for Krueger flap, on the outboard wing may be used for structural torsion alleviation and thus maintain reasonable wing thicknesses and wave drag levels as a consequence.

Rudder and aileron control power and actuator rate are sized adequately to handle gust upset for a side discrete gust. For example, in an aircraft maximum takeoff weight with takeoff speed of 200 knots, the aircraft can be designed to be neutrally stable in the yaw axis. The rudder control power is sized to provide augmentation for stabilization. Additionally, aileron deflections are sized to maintain wing level at a selected gust frequency, for example based on gust length of 700 feet and a severe gust intensity of 30 knots (50 fps) corresponding to 7 degrees of sideslip upset.

In a particular embodiment, rudder size and rudder yaw control effectiveness are determined by measurements of yawing moment coefficient ΔCn for various angles-of-attack and Mach numbers, including flexible effects due to structural bending. Maximum rudder deflections of ±30 degrees are used for low speeds, and ±10 degrees are used for high speeds. Rudder yaw effectiveness generally decreases at increasing Mach number due to the flexible effects as dynamic pressure increases at higher Mach numbers. A relatively large rudder area and relatively aftward positioning of the vertical tail improve rudder yaw control effectiveness.

Figure 4A:
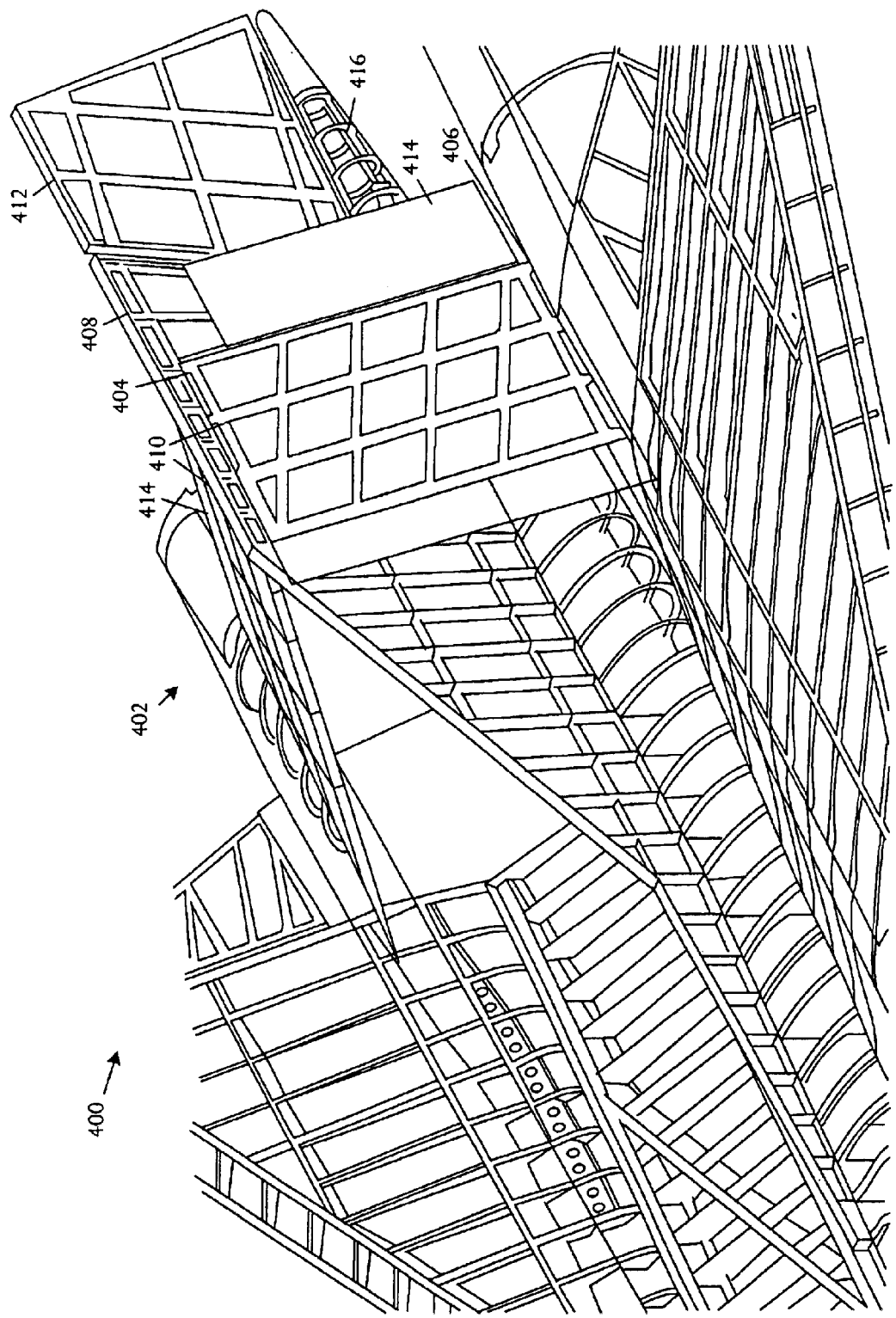
FIGS. 4A and 4B depicts two schematic pictorial diagrams showing an example of an embodiment of a tail structure for usage with the described supersonic aircraft.
Figure 4B:
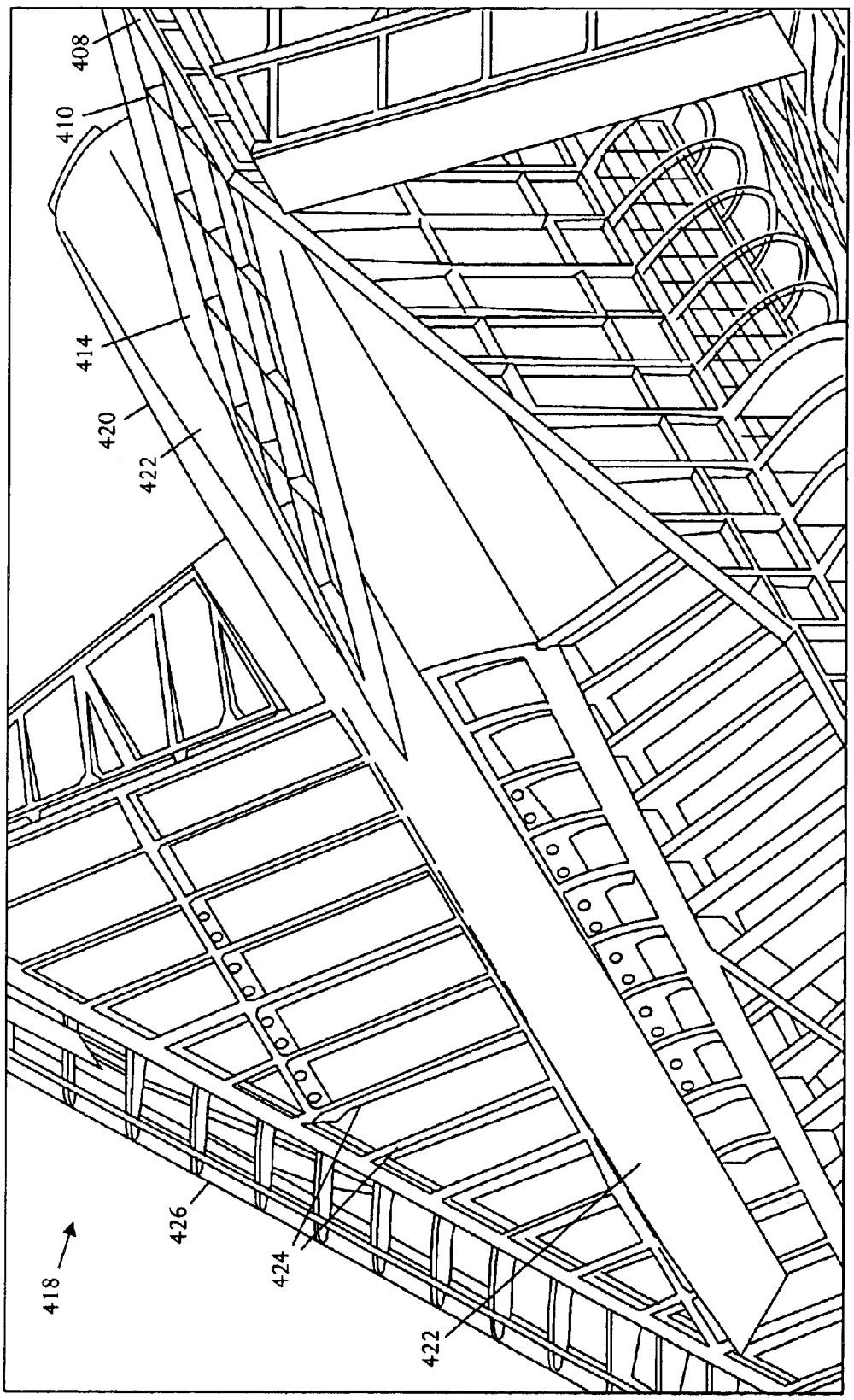

Referring to FIGS. 4A and 4B, two schematic pictorial diagrams show an example of an embodiment of a tail structure 400 for usage with the described supersonic aircraft. The tail structure 400 includes a tail structure section 402, a vertical stabilizer to inverted stabilizer joint section 404, and an inverted stabilizer to nacelle joint section 406. The tail structure 400 includes a vertical stabilizer 408, and a pair of inverted stabilizers 410. Control structures include a rudder 412 pivotally connected to the trailing edge of the vertical stabilizer 408 and ruddervators 414 pivotally connected to the trailing edge of the inverted stabilizers 410.

The vertical stabilizer 408 is attached to the top of the aircraft center body and aft section 416. The top of the vertical stabilizer 408 is attached to the tops of the left and right inverted stabilizers 410.

FIG. 4B shows a view of a right nacelle structure 418 including the right engine nacelle 420, a right structural support member 422, such as a torque box or torsion box, and wing spars 424 within the right wing 426. The right nacelle structure 418 is attached to the right wing section 426 and the lower right inverted stabilizer 410.

The wing 426 includes multiple support spars or ribs 424 within a wing that support the wing structural support members 422 on the right and left sides of the aircraft. The wing structural support members 422 have a configuration that reduces body freedom flutter by increasing chordwise wing bending by engine rib enhancement. The wing ribs 424 are capable of supporting the wing structural support members 422 and reducing and/or eliminating nacelle structural torsion. The wing structural support members add volume that integrates with a lowest far-field wave drag penalty and blends, as a fillet, with the inverted V-tail 400.

Figure 5A:
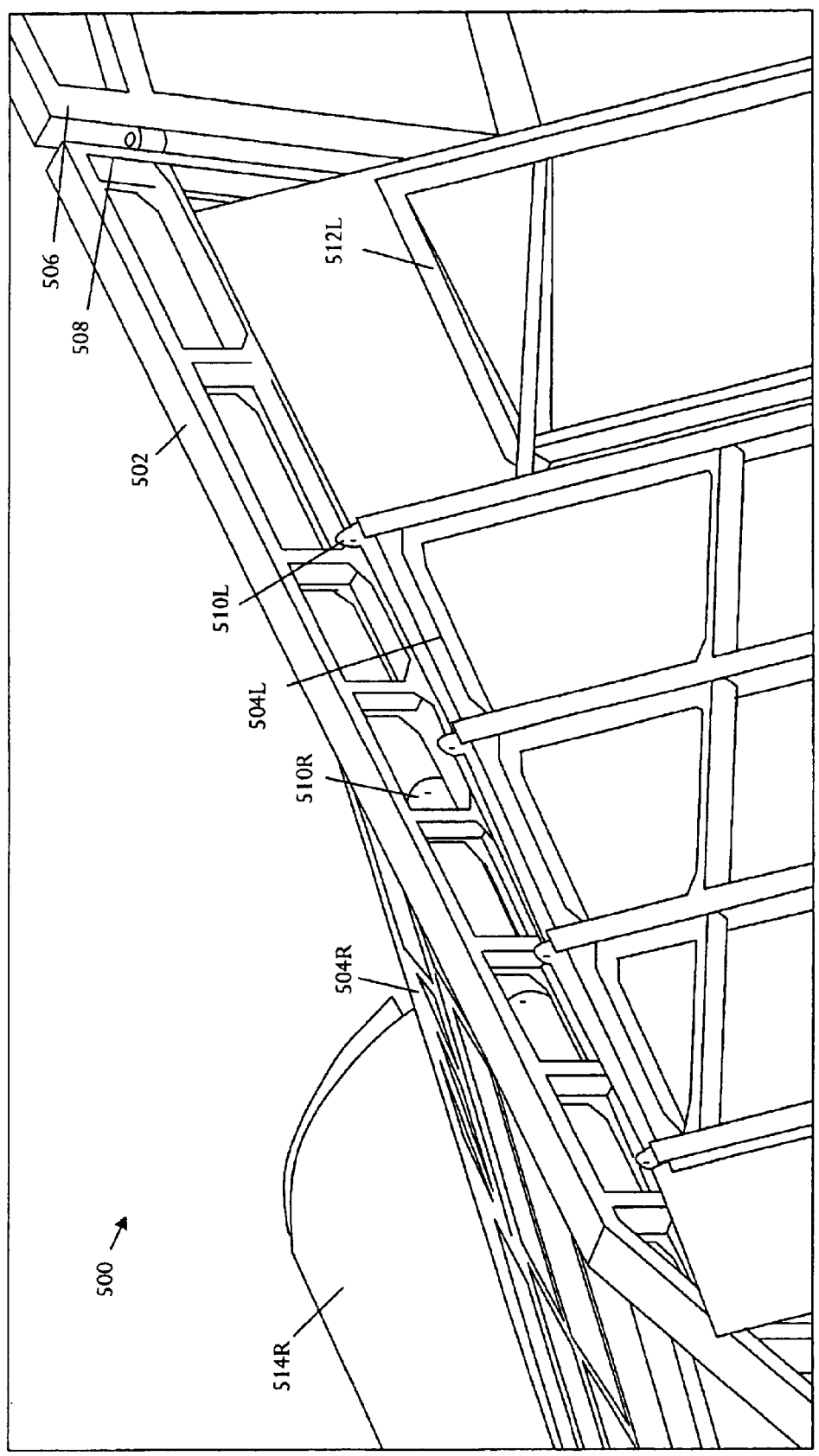
FIGS. 5A, 5B, and 5C are schematic perspective pictorial views showing detailed diagrams of portions of the tail structure.
Figure 5B:
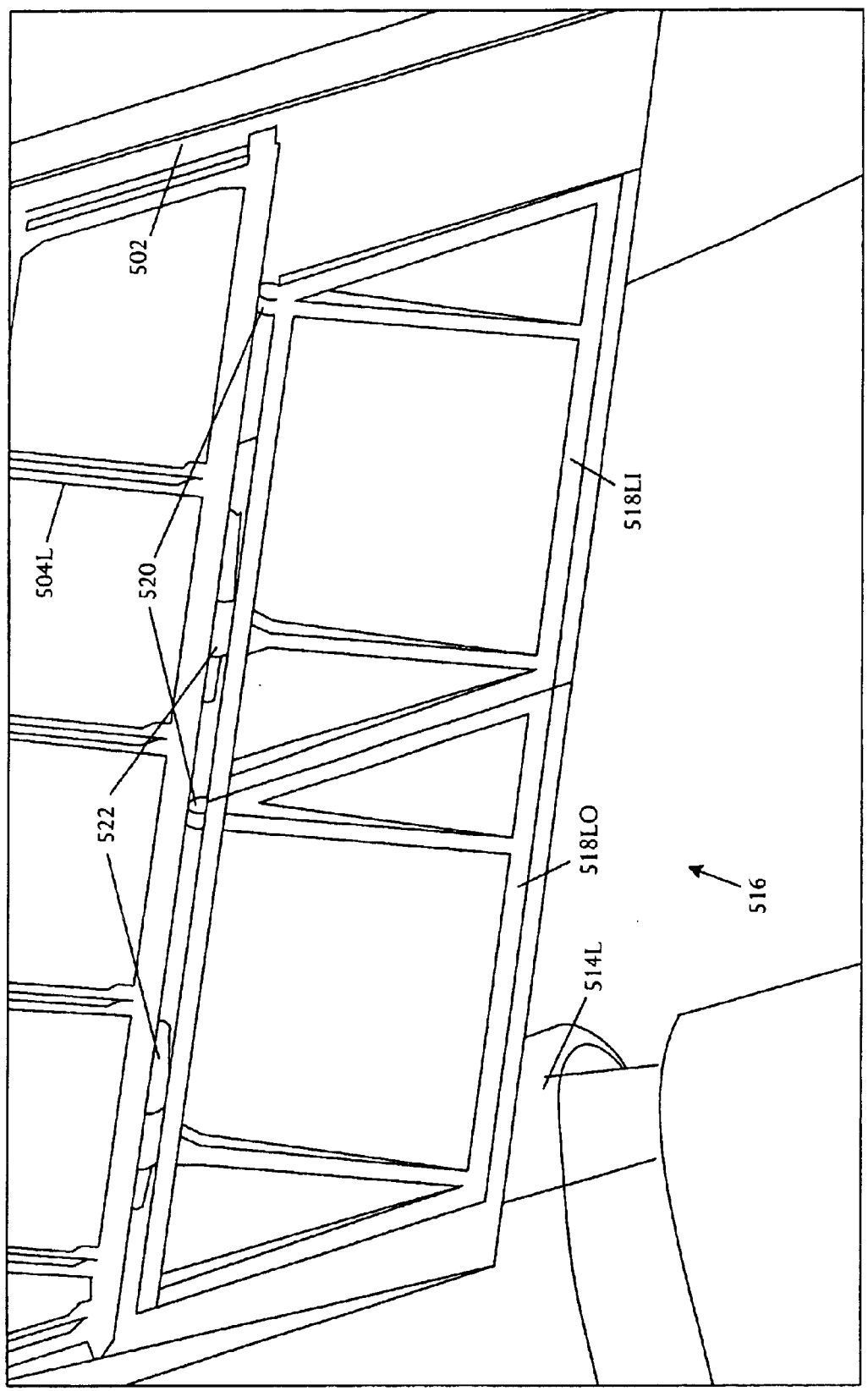
Figure 5C:
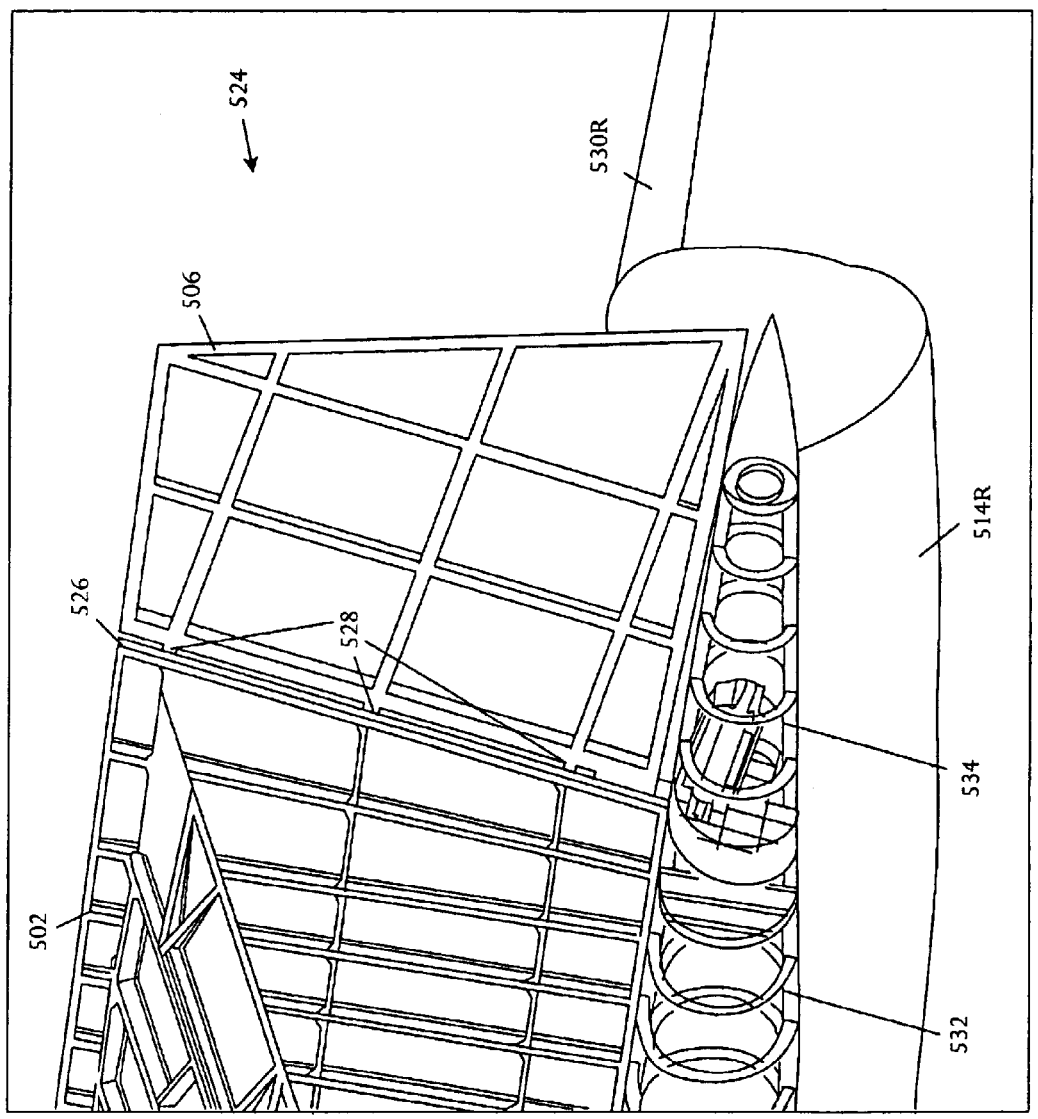

Referring to FIGS. 5A, 5B, and 5C, three schematic perspective pictorial views show detailed diagrams of portions of the tail structure 500. FIG. 5A depicts a view of the interface between a vertical stabilizer 502 and inverted stabilizers 504L, R. The top of the right 504R and left 504L inverted stabilizers are attached to the top of the vertical stabilizer 502. A rudder 506 is attached to the aft end 508 of the vertical stabilizer 502. The illustrative inverted stabilizers 504L, R couple to the vertical stabilizer 502 using left 510L and right 510R stabilizer upper lugs. Also shown in a left ruddervator surface 512L pivotally coupled to the left inverted stabilizer 504L.

The right inverted stabilizer 504R attaches to the wing adjacent to the right nacelle 514R.

FIG. 5B shows a ruddervator section 516 including the left inverted stabilizer 504L coupling between the vertical stabilizer 502 and the left wing adjacent to the left nacelle 514L. The illustrative configuration includes two ruddervators on each side, each of which is coupled to the inverted stabilizer. In the depicted view, a left outboard ruddervator 518LO and a left inboard ruddervator 518LI are shown coupled to the left inverted stabilizer 504L using ruddervator hinges 520 and actuator hinges 522 that control movement of the ruddervators.

FIG. 5C illustrates the rudder section 524 including the rudder 506 that is pivotally attached to the trailing edge 526 of the vertical stabilizer 502 by rudder hinges 528. The view also shows the right wing 530R and right nacelle 514R. In the illustrative embodiment, the aircraft fuselage 532 extends aft with the aft portion of the fuselage forming a fuselage tail cone 534. The rudder 506 is merged with the fuselage tail cone 534 so that the rudder and tail cone rotate pivotally with respect to the central vertical stabilizer 502 and the forward portion of the fuselage 532.

Figure 6A:
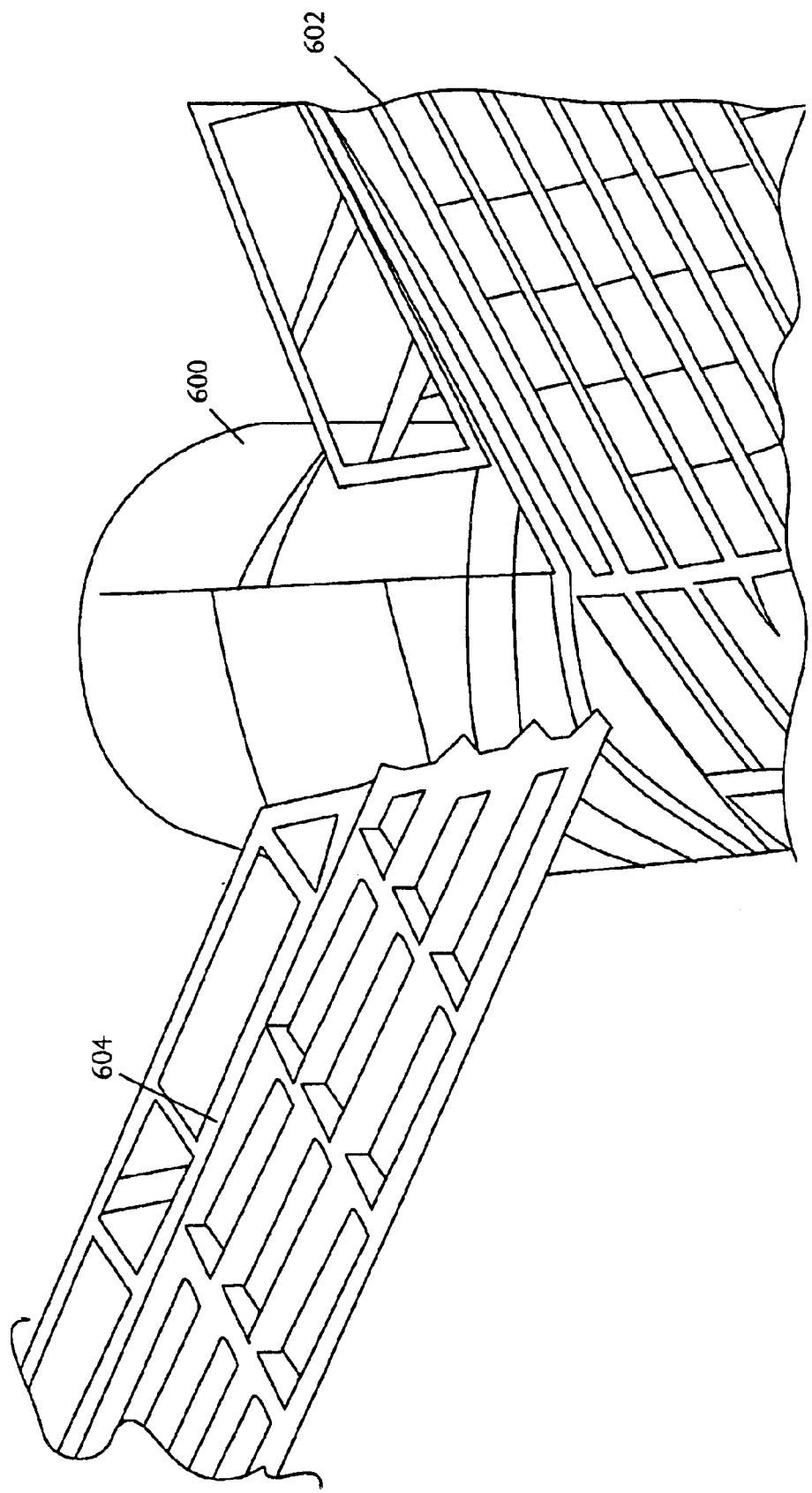
FIGS. 6A and 6B are schematic pictorial views that illustrate an embodiment of a tail/nacelle integration.
Figure 6B:
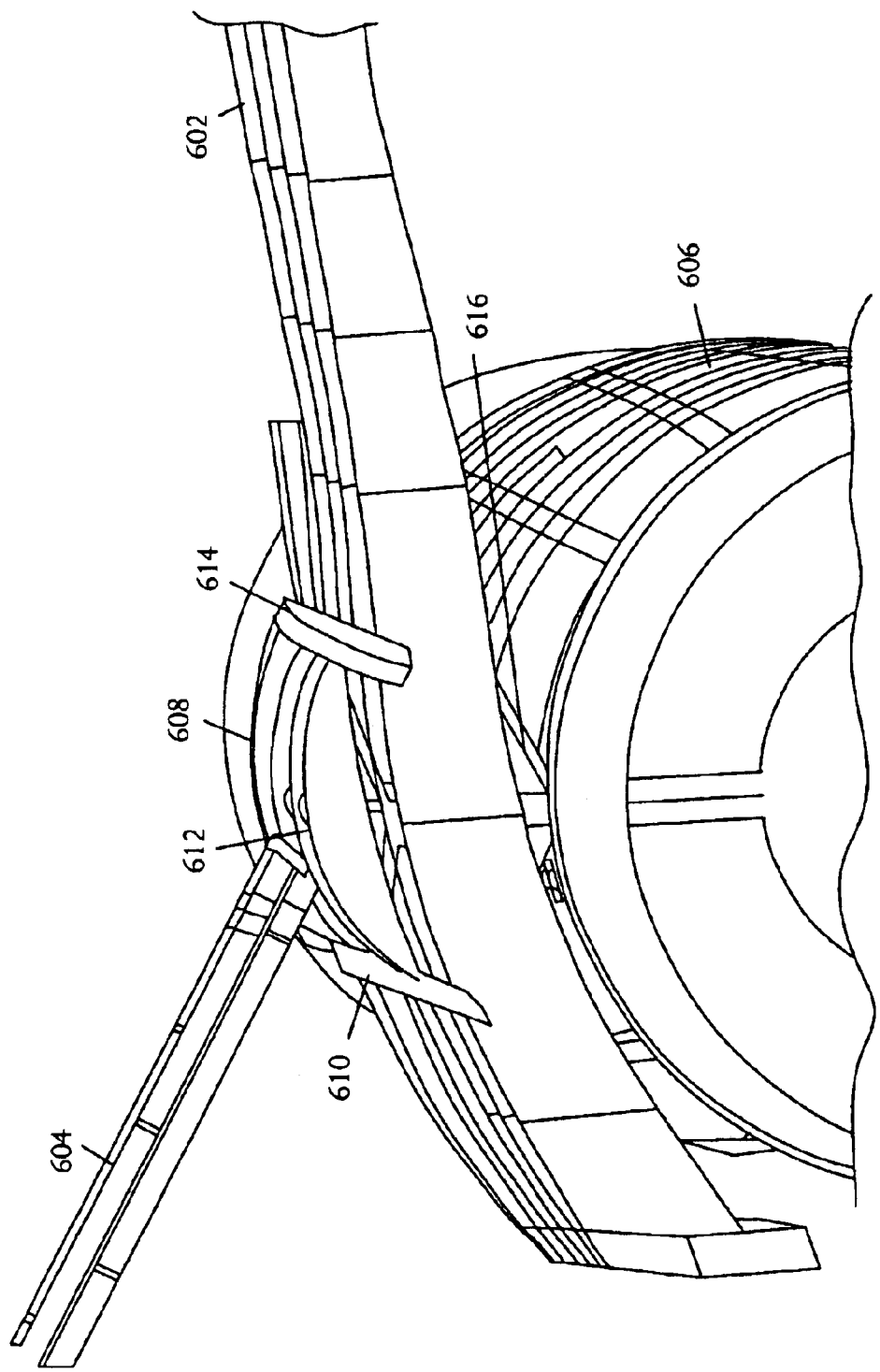

FIGS. 6A and 6B are schematic pictorial views that illustrate an embodiment of a tail/nacelle integration. Referring to FIG. 6A, a schematic pictorial diagram depicts the integration of a left nacelle 600, left wing 602, and left inverted V-tail stabilizer 604. The top of the right and left 604 inverted stabilizers are attached to the top of the vertical stabilizer.

FIG. 6B is a view aft at the nacelle integration to the wing 602. The top of torque box is removed for clarity. An accessory access panel is shown on the bottom of nacelle 606 and the nacelle skin is removed for clarity. The torque box 608 includes a left inboard torque box channel 610, left torque box support 612, and left outboard torque box channel 614. The torque box 608 also includes ducts for carrying fluids for the aircraft environmental control system. A diverter 616 is positioned between the torque box 850 and the left outboard wing 602.

Referring to FIGS. 7A, 7B, 7C, and 7D, front, bottom, and side pictorial structural views show an example of a nacelle, wing, and tail configuration. A nacelle structure 700 includes a right nacelle structure 702 and left nacelle structure 704. The right nacelle structure 702 is attached to the right wing section 706 and the lower right inverted stabilizer 708. The left nacelle structure 704 is attached to the left wing section 710 and the lower left inverted stabilizer 712. A left structural support member or torque box 716 is attached to the top of the left wing surface 710 and engine inboard 718 and outboard 720 diverters. The left engine outboard diverter 720 attached to the lower surface of the left wing 710 and the top of the engine nacelle 704. The left engine outboard diverter 720 attaches the frames of the left engine nacelle 704.

Figure 7A:
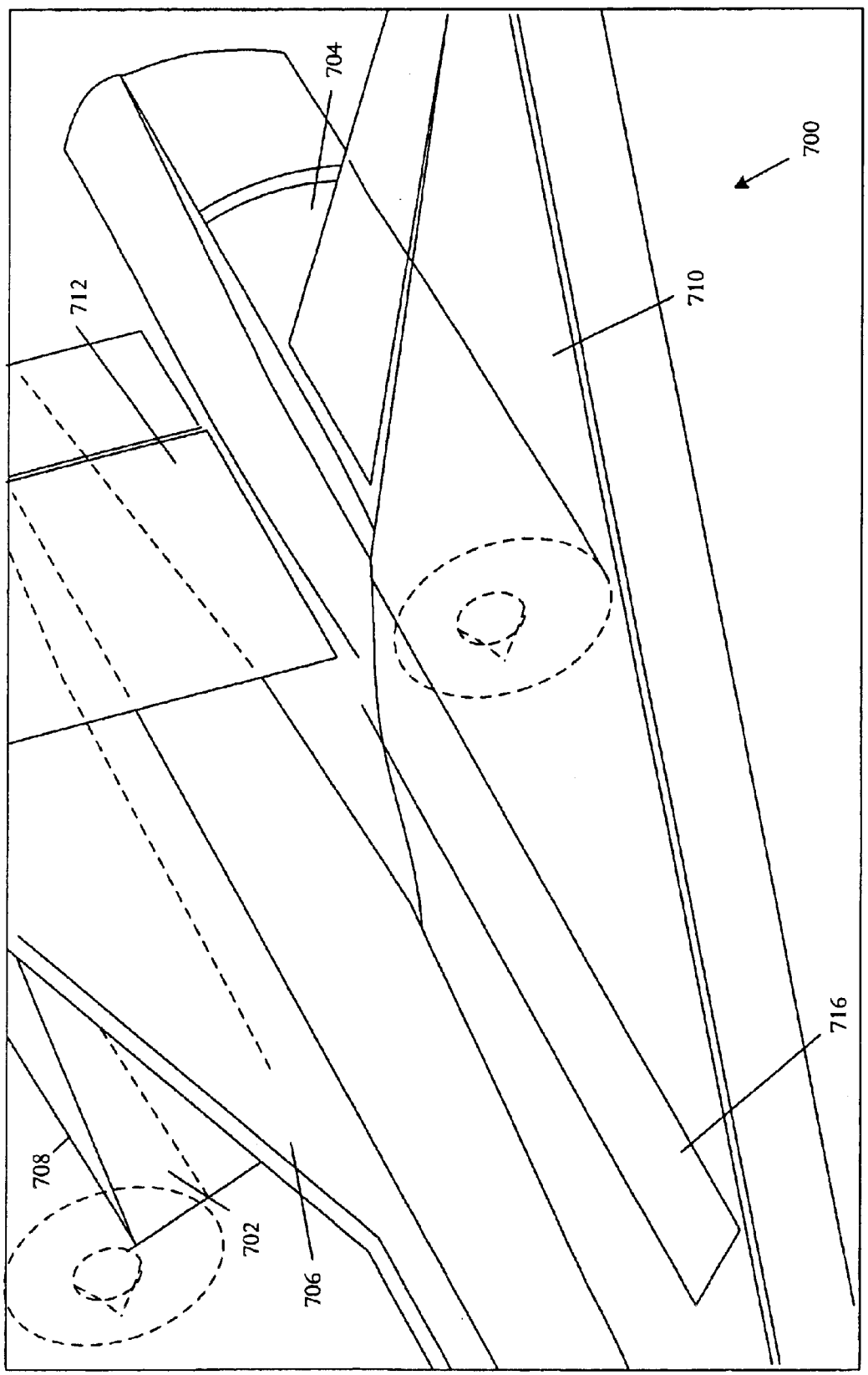
FIGS. 7A, 7B, 7C, and 7D, are multiple perspective pictorial views showing an example of a nacelle, wing, and tail configuration.
Figure 7B:
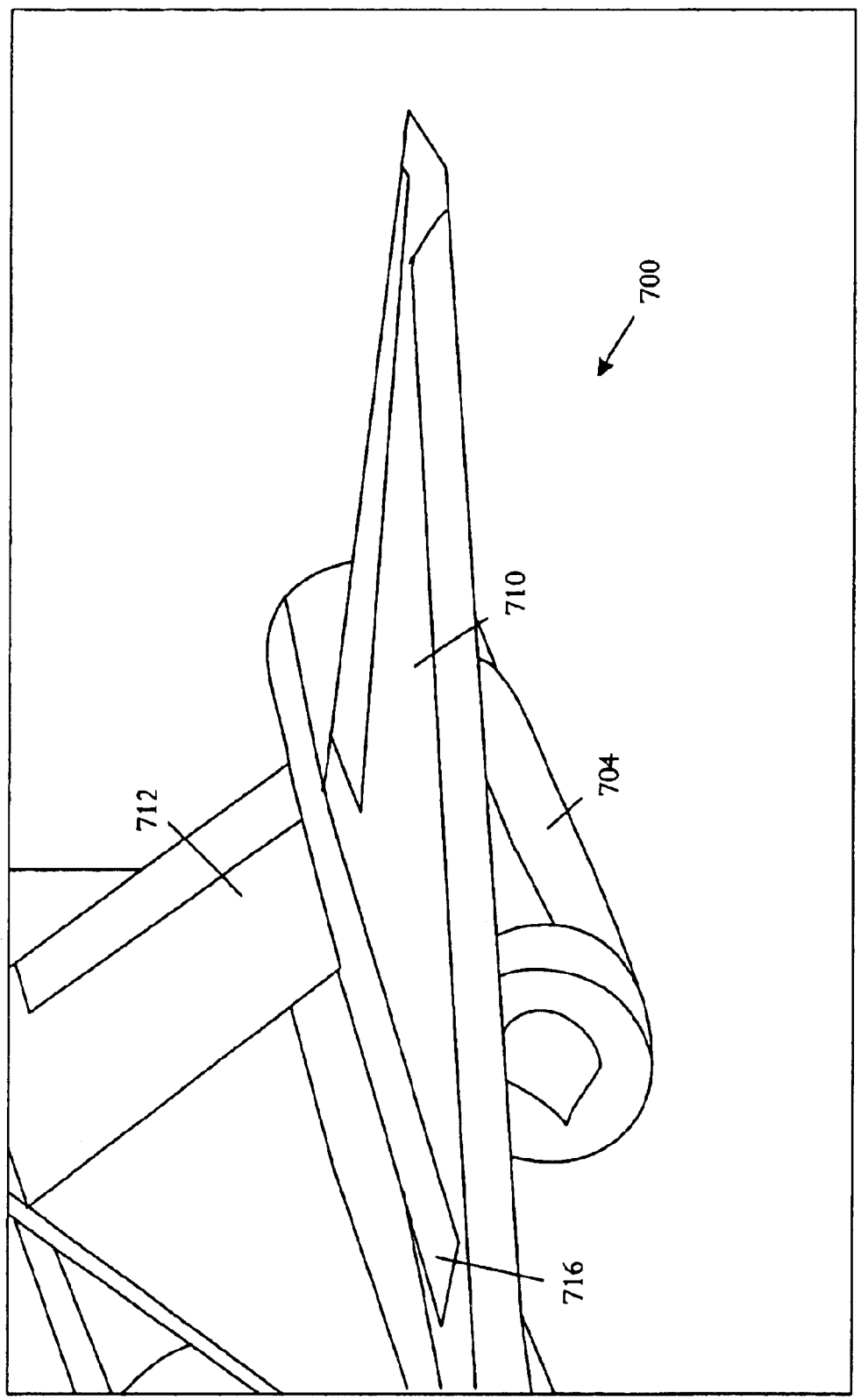
Figure 7C:
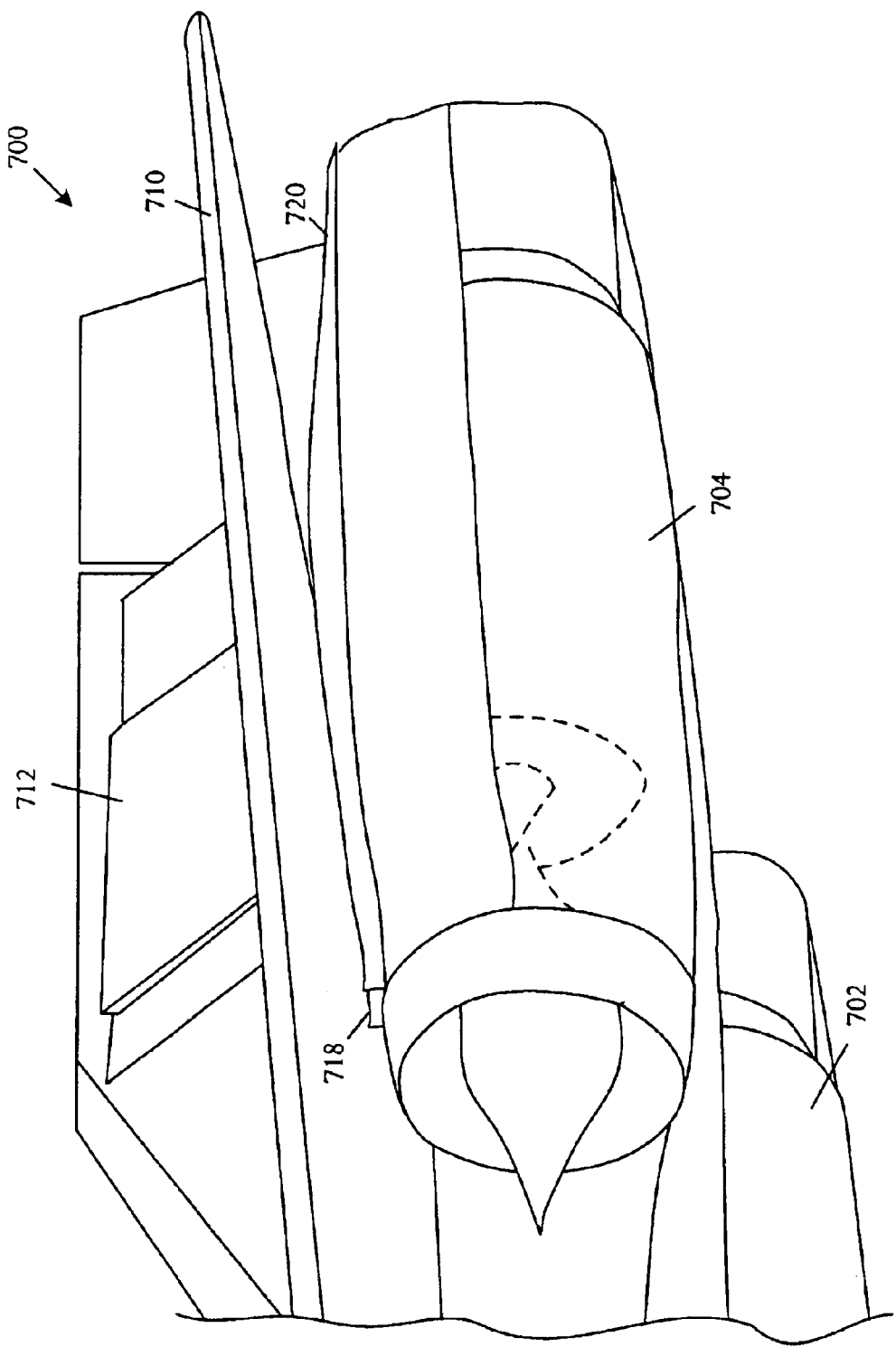
Figure 7D:
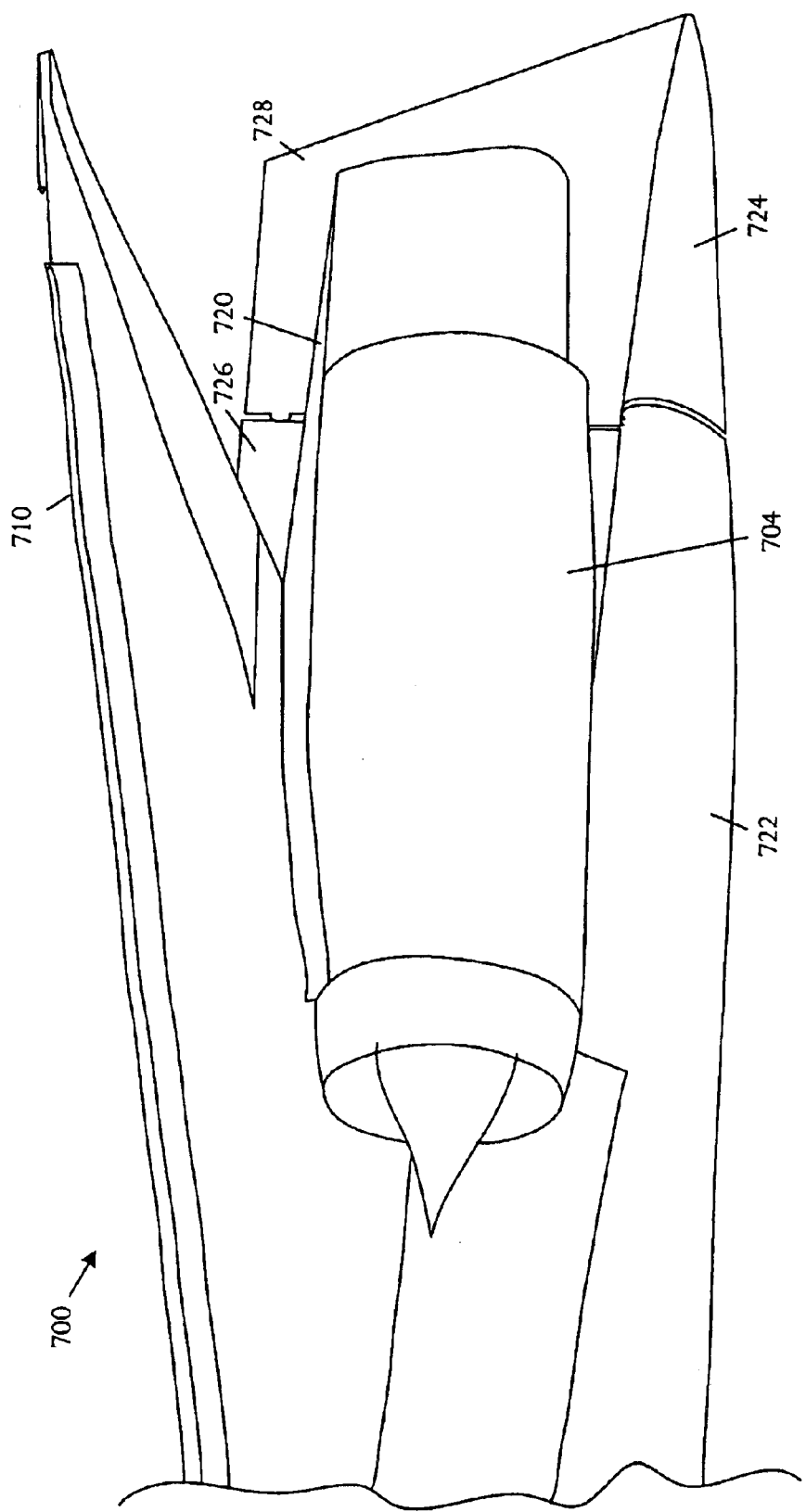

FIG. 7D shows the left nacelle, wing, and tail configuration for an embodiment with the fuselage 722 merged with the wing 704 and extends and aft to a fuselage tail cone 724. The tail includes a vertical stabilizer 726 and a rudder 728 pivotally attached to the aft edge of the vertical stabilizer 726. The rudder 728 is merged with the fuselage tail cone 724 so that the rudder and tail cone rotate pivotally with respect to the central vertical stabilizer 726 and the fuselage 722.

Figure 8:
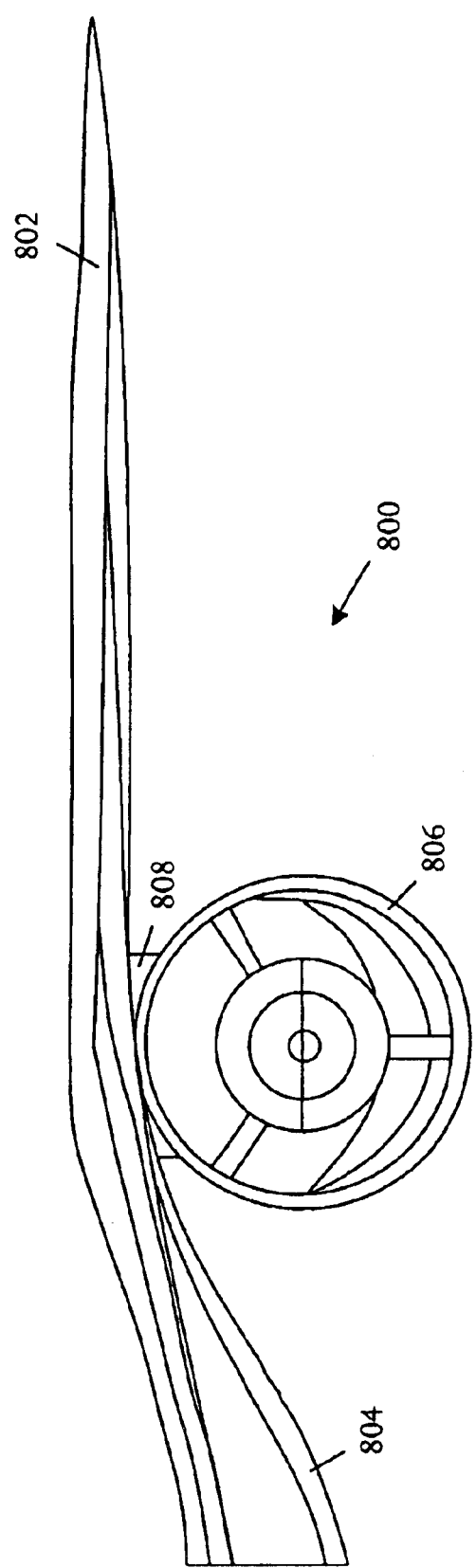
FIG. 8 is a pictorial diagram showing a frontal view of a wing and nacelle geometry in an illustrative low sonic boom aircraft.

Referring to FIG. 8, a pictorial diagram shows a frontal view of a wing and nacelle geometry 800 in an illustrative low sonic boom aircraft. The wing 802 has a gull or dihedral 804 inboard of the engine nacelles 806. The wing inboard dihedral 804 integrates with the nacelles 806 and enhances low-sonic-boom signature by vertically staggering wing longitudinal lift distribution. The dihedral gull 804 is formed by twisting and cambering the wing 802 for low sonic boom and low induced drag.

In some embodiments the wing trailing edge can be integrated to optimally relieve the diverter channel 808 so that the wing 802 wraps around the nacelle 806 so that the trailing edge is not constrained to be linear in the vertical direction. The trailing edge can be shaped to relieve the area that diverges due to the dihedral 804.

Figure 9A:
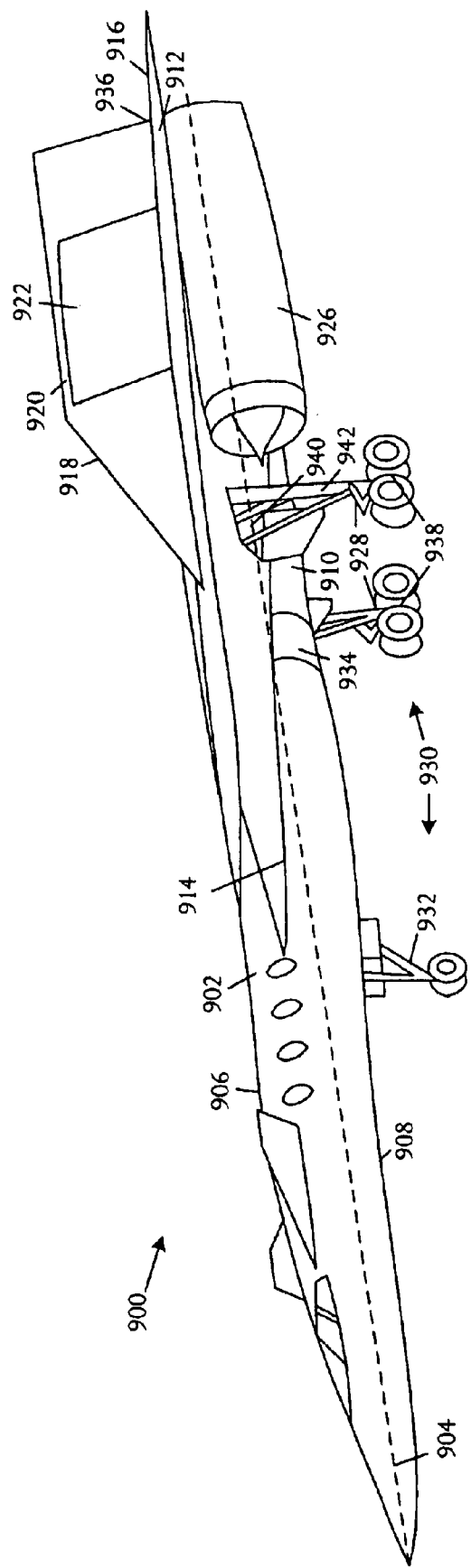
FIGS. 9A, 9B, and 9C are multiple schematic pictorial diagrams depicting an embodiment of a supersonic aircraft that includes a fin strake to improve fuselage stiffness.
Figure 9B:
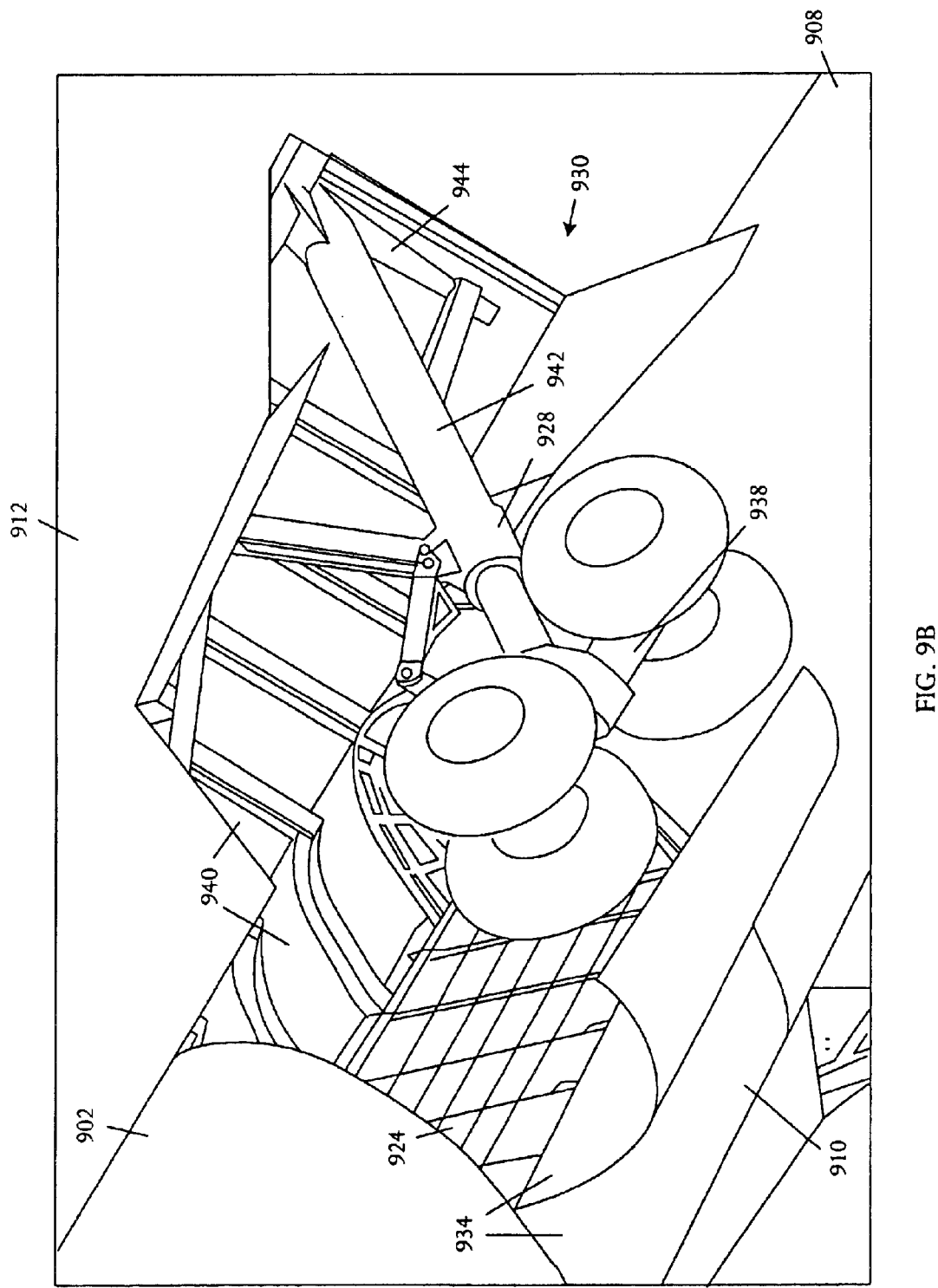
Figure 9C:
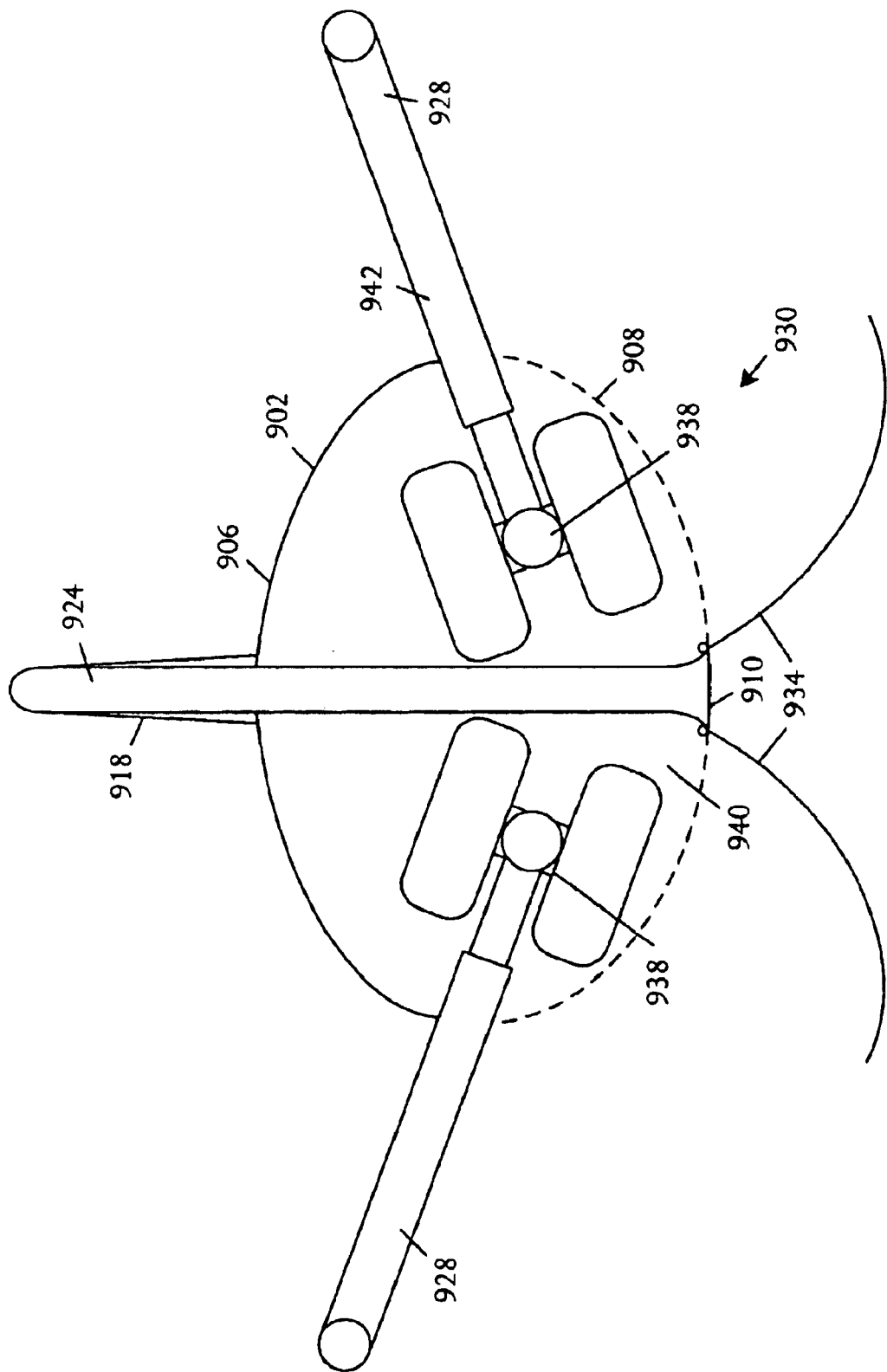

Referring to FIGS. 9A, 9B, and 9C, multiple schematic pictorial diagrams depict an embodiment of a supersonic aircraft 900 comprising a fuselage 902 extending forward and aft about a longitudinal axis 904. The fuselage 902 has upper surface 906 and lower surface 908. The lower surface 908 has a general axial curvature about the longitudinal axis and a local aft flattening 910. The flattened fuselage adds lateral stiffening to the aircraft structure. The aircraft 900 further comprises a wing 912 coupled inboard to the fuselage 902 and extending outboard. The wing 912 also extends from a forward leading edge 914 to an aft trailing edge 916. The aircraft 900 has an inverted V-tail 918 coupled to the wing 912 and fuselage 902 comprising a central vertical stabilizer 920, at least two inverted stabilizers 922 coupled to sides of the central vertical stabilizer 920 and to the wing 912 outboard of the fuselage 902. The aircraft 900 also has a strake 924 coupled to and extending from the central vertical stabilizer 920 through the fuselage interior and coupling to the lower fuselage surface, for example a keel running through the center of the fuselage 902, at the position of local aft flattening 910.

The fuselage/fin keel structure that includes the fin strake 924 improves aircraft fuselage stiffness. A reduced volume in the fuselage 902 facilitates sonic boom reduction and control. The added strength from the dorsal or strake 924 enables a desired reduction in fuselage volume and compensates for any reduction in stiffness that results from the flattened fuselage 910.

The inverted V-tail 918 is integrated into the wing trailing edge 916. The wing 912 has a gull or dihedral inboard of the couplings of the inverted stabilizers 922 to the wing 912. The dihedral increases take-off roll at the fuselage tip, extends lifting length, and reduce sonic boom effect.

The supersonic aircraft 900 has engine nacelles 926 coupled beneath the wing 912 at the wing trailing edge 916, and two main landing gear 928 coupled to the wing lower surface, inboard of the engine nacelles 926. The main landing gear 928 retract into the wing 912 and fuselage 902. The wing 912 inboard portion integrates with the nacelle 926 and forms the dihedral gull that enhances low-sonic-boom signature by vertically staggering longitudinal lift distribution. The dihedral gull is formed by twisting and cambering the wing 912 for low sonic boom and low induced drag while preserving a tailored local wing contour at a location of main landing gear retraction.

In some embodiments, the aircraft can have Krueger flaps mounted on the leading edge 914 of the wing 912. The wing leading edge 914 is configured sufficiently straight to accommodate a simple hinge line for the Krueger flap. The inboard wing 912 integrates with the engine nacelles 926 and follows the low sonic boom fuselage 902 contour with a sufficiently normal configuration to attain low interference drag. The wing 912 has an inboard flap hinge line fully contained within the wing contour with the wing 912 upper and lower surfaces having an essentially planar form.

FIG. 9A is a perspective side view of the landing gear system 930 with the nose landing gear 932 and the dual main landing gear 928 extended and fuselage landing gear doors 934 closed. The landing gears 932 and 928 are retracted during cruise flight. The landing gear 932 and 928 are extended an in a locked position. The landing gear 932 and 928 supply sufficient clearance between the fuselage tail 936 and the lower aft part of the engine nacelle 926 during rotate takeoff and high angle flare landing operations.

The main landing gear 928 is located forward and inboard of the engine nacelles 926. The described main landing gear 928 and integration of the landing gear configuration within the aircraft structure facilitate ground stability. In the illustrative embodiment, the aircraft 900 has a structure that increases stability by increasing tail scrape angle and widening the wheel base. The tail scrape angle is increased by lowering the fuselage 902 and raising the engines and nacelles 926, for example by virtue of a gulling of the wing 912 that relatively raises the engine.

The retracted main landing gear 928 fits into the wing 912 at an angle that matches the wing dihedral. Wing dihedral increases the aerodynamic stability of the aircraft 900 and benefits engine/wing iteration to reduce drag. In some embodiments, the wing 912 includes Krueger flaps and the leading edge 914 of the wing 912 extends in an essentially straight line to facilitate using a simple hinge line that accommodates the Krueger flaps. Some embodiments have a wing 912 with reduced leading and trailing edge sweeps.

Wheels of a four-wheel truck 938 are aligned fore and aft in the fuselage 902 to reduce or minimize cross-sectional volume and compactly stored in a landing gear compartment or wheel well 940. The main landing gear geometry integrates into the inboard wing dihedral of the aircraft 900 and has a size that fits into a compact fuselage volume by virtue of the forward and inboard retraction. The main landing gear geometry also conforms to available load paths of the aircraft structure to react to landing gear loads.

The main landing gear 928 have sufficient length to supply ground clearance between the engine nacelles 926, aft-body of the fuselage 902, wingtips, and engine nacelles with respect to the runway or static ground line. To reduce or minimize the risk that the landing gear will fail to extend, the tail main landing gear 928 omits shortening mechanisms including folding and hinge structures. The aircraft accommodates the tail main landing gear 928 by retracting the gear forward and inboard into the main landing gear compartments 940 that similarly angle in a forward and inboard direction.

In some embodiments, the inboard portion of the wing 912 is configured to integrate with the nacelle and a diverter formed between the nacelle and the wing 912 to follow the contour of a low-sonic-boom fuselage 902 with as close to normal intersection as possible to attain low interference drag. In some embodiments, an inboard flap hinge line is fully contained within the wing contour with the wing 912 upper and lower surfaces held as planar as possible to facilitate seal design.

With the resulting wing configuration, the wing gull raises the engines and nacelles 926 to increase available tip back angle and reduce thrust-induced pitching moments. The gull enhances low-boom signature by vertically staggering the wing longitudinal lift distribution and lowers the aircraft body or fuselage 902 to reduce the height of the cabin door above the ground, thereby reducing entry stair length. The low fuselage 902 assists in maintaining a low aircraft center of gravity, reducing tip over angle and promoting ground stability. The wing gull forms a wrapping of the wing 912 around the nacelle that enhances favorable interference between the inlets and the wing 912, resulting in a wing/body/nacelle geometry conducive to successful ditching and gear-up landings.

FIG. 9B shows a bottom view of the left main landing gear 928 during retraction. In the illustrative conditions, the left landing gear strut 942 is partially retracted at about a 60° angle from the fully extended position. A high axial load is imposed on the main gear trunnion link 944 due to non-normal angle between the main strut 942 and the trunnion axis which is reacted into the wing structure 912. The landing gear 928 retracts to an angle that follows wing contours of an inboard dihedral. The landing gear 928 fits within local wing 912 contours and is stored in the landing gear compartment 940 within the wings 912 and fuselage 902.

FIG. 9C is a cross-sectional view of the fuselage 902 at the position of the landing gear compartment 928. The strake 924 extends from the dorsal fin, vertical stabilizer 920 entirely through the fuselage 902 from the upper surface 906 to the lower surface 908. The strake 924 extends through the main landing gear compartment 928 to the flattened portion 910 of the fuselage 902. The strake 924 carries the inverted V-tail 918 bending loads through the aft fuselage 902, reducing the effects of body flutter and facilitating improvement of sonic boom reduction performance by enabling a smaller cross-section in the fuselage 902.

Figure 10:
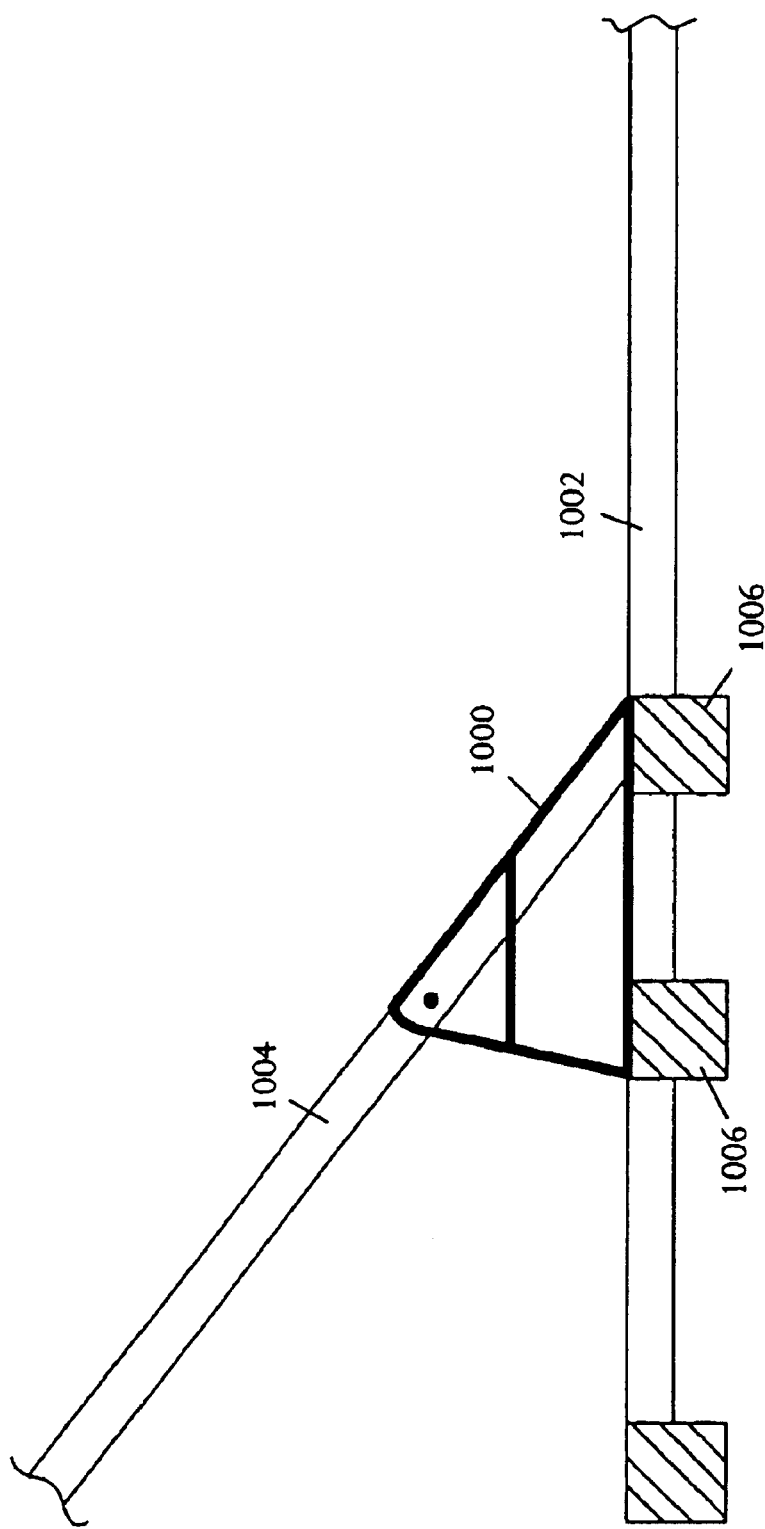
FIG. 10 is a schematic pictorial diagram that illustrates an embodiment of a structural support member.

Referring to FIG. 10, a schematic pictorial diagram illustrates an embodiment of a structural support member 1000 that attaches to a wing 1002 and to an inverted stabilizer 1004. The structural support member 1000 firmly attaches to structural ribs 1006 that supply structural support to the wing 1002 and connect the diverter to the wing 1002. Typically, the support ribs in a wing are distributed at regular intervals along the wing. In the illustrative embodiment, the outboard rib 1006 is moved inboard so that the structural support member 1000, in combination with the inverted stabilizer 1004 and the wing 1002, supply increased support to the engine, nacelle, and diverter. Accordingly two diverter ribs 1006 are closely spaced with a narrow structural support member 1000 extending and affixed to the ribs 1006. The structural support member 1000 adds volume to increase support to the main spar or rib 1006 in the wing 1002. The structural support member 1000 also wraps around the intersection of the inverted stabilizer 1004 and the wing 1002 to form a fairing that improves aerodynamics.

Figures 11A, 11B:
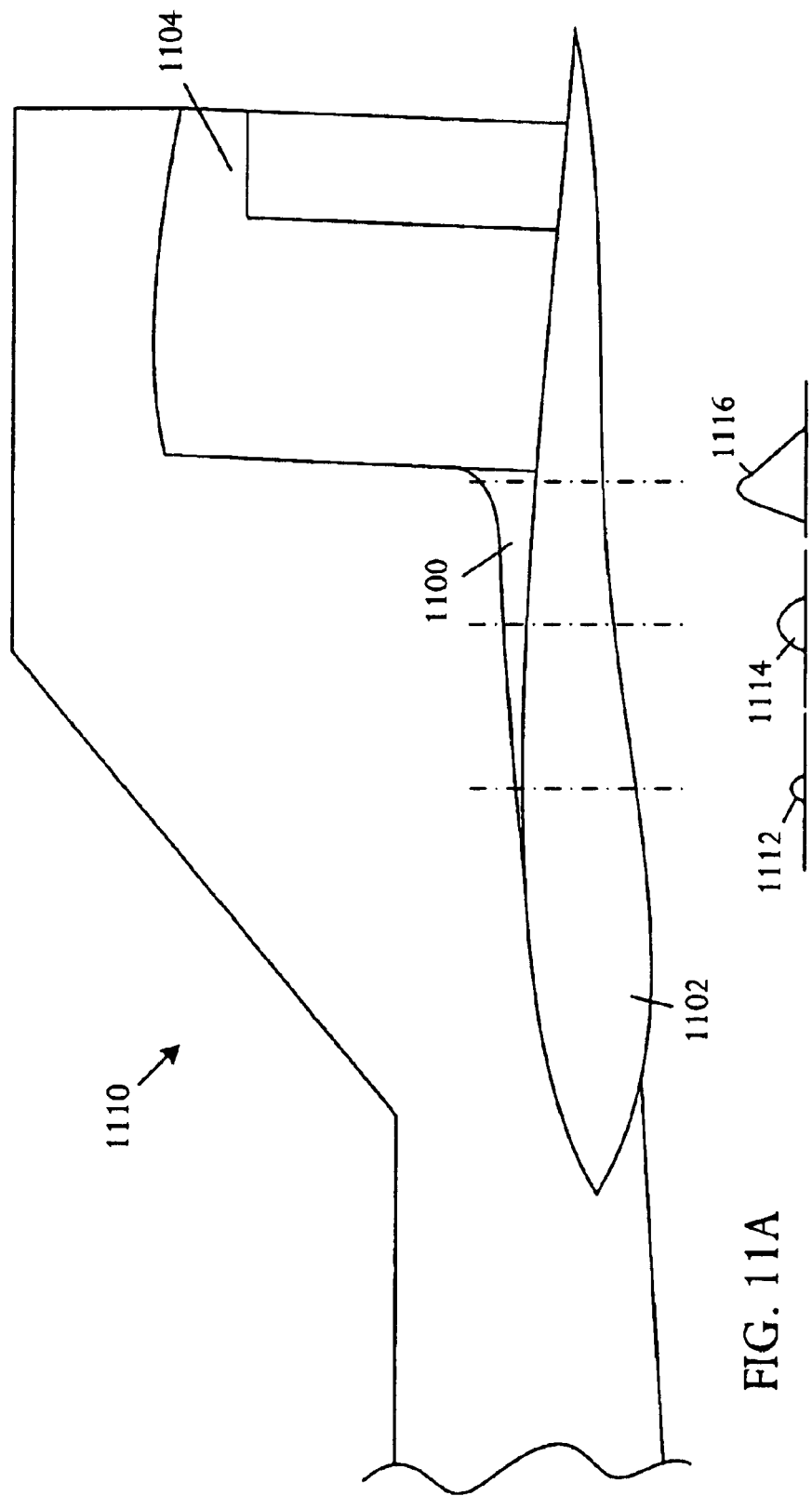
FIGS. 11A and 11B are pictorial diagrams showing a side view, and a plurality of cross-sectional views, of an embodiment of a structural support member.

Referring to FIGS. 11A and 11B, a pictorial diagram shows a side view, and a plurality of cross-sectional views, of an embodiment of a structural support member 1100. The views shown an aircraft tail 1108 with the structural support member 1100 connected to a wing 1102 and inverted stabilizer 1104. The structural support member 1100 has an aerodynamic structure, shown in the forward 1112, medial 1114, and aft 1116 cross-sectional views. The aerodynamic form enables the structural support member 1100 to have additional volume that increase strength while reducing drag.

Figures 12A, 12B:
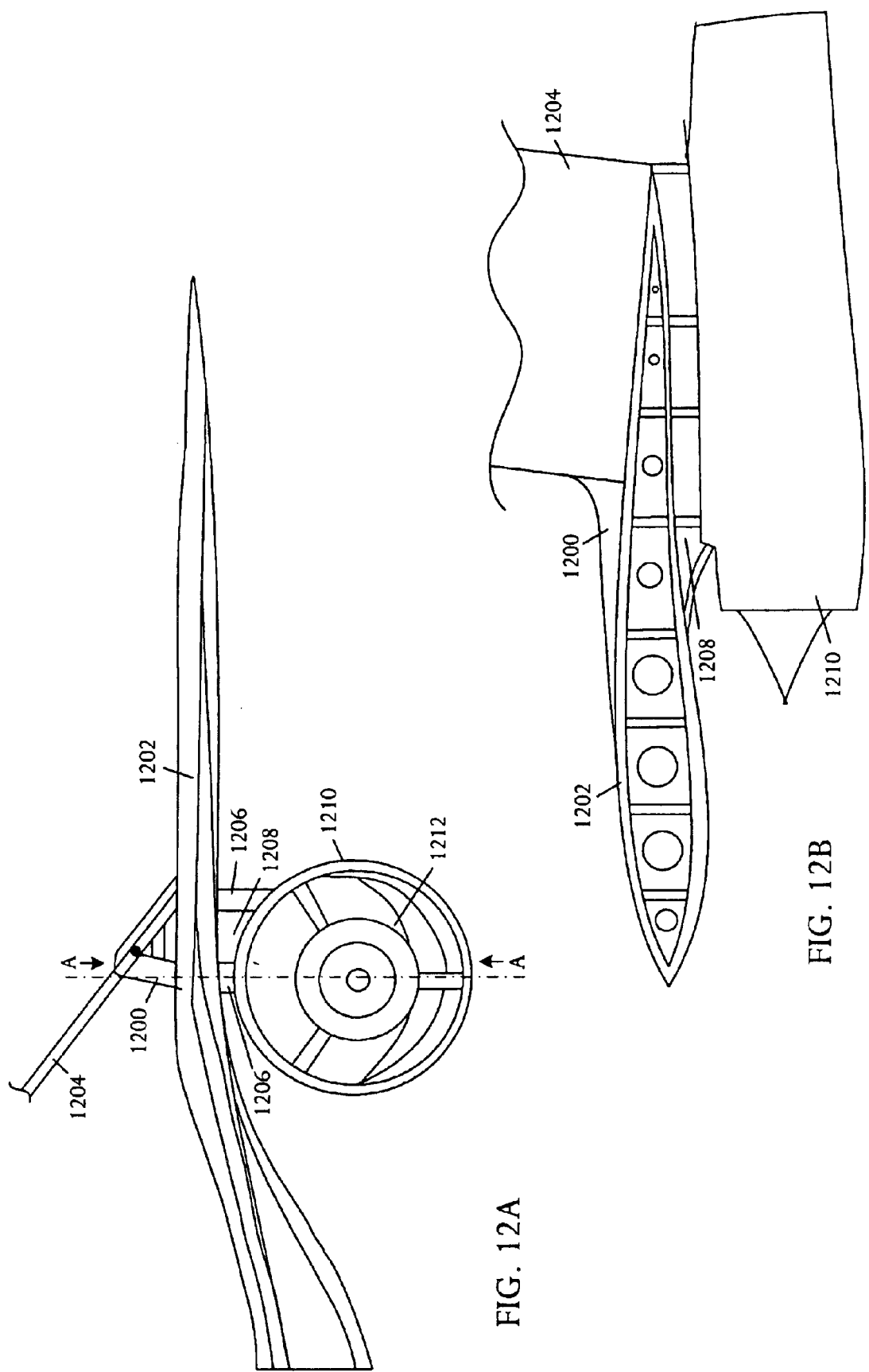
FIGS. 12A and 12B are pictorial diagrams illustrating frontal and side views, respectively, of a structural support member.

Referring to FIGS. 12A and 12B, pictorial diagrams illustrate frontal and side views, respectively, of a structural support member 1200. The structural support member 1200 attaches to a wing 1202 and inverted stabilizer 1204 and couples to ribs or spars 1206 that support the wing 1202 and a diverter 1206 beneath the wing 1202. The diverter 1208 is attached between the wing 1202 and a nacelle 1210 that encases an engine 1202. The diverter 1208 improves aerodynamics of the connection between the nacelle 1210 and the wing 1202.

The illustrative structural support member 1200 adds volume to the connection of the nacelle 1210, the diverter 1208, and the wing 1202, supported by the inverted stabilizer 1204 while maintaining an aerodynamic form. The structural support member 1200 forms an aerodynamic fairing that wraps around the junction of the wing 1202 and the inverted stabilizer 1204. The structural support member 1200 is connected to the diverter ribs 1206 and, in the illustrative embodiment, the diverter 1208 has a swept leading edge that improves aerodynamics of the connection between the nacelle 1210 and the wing 1202. The diverter 1208 also has a relatively large depth, for example in the range of six to twelve inches from the wing 1202 to the nacelle 1210 to add stiffness to the structure. In one embodiment, the diverter 1208 has a depth of about eight inches. Support supplied by the structural support member 1200 enables the diverter 1208 to have an increased depth and to be moved forward relative to the wing 1202 and nacelle 1210 to improve the strength and aerodynamics of the wing-nacelle-inverted stabilizer structure.

In an illustrative embodiment, the diverter 1208 couples the engine nacelle 1210 to the wing 1202 with a pair of ribs 1206 extending through the wing 1202 and diverter 1208. The ribs 1206 support the engine nacelle 1210 and are closely spaced with a first rib approximately aligned with the center of the nacelle 1210 and a second rib inboard of the first rib approximately to the inboard edge of the engine nacelle 1210. The structural support member 1200 extends essentially between the first and second ribs 1206 and extends vertically upward to the inverted stabilizer 1204 to add volume for strength while wrapping about the connection of the wing 1202 and inverted stabilizer 1204 as an aerodynamic fairing.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the invention. Variations and modifications of the embodiments disclosed herein may be made based on the description set forth herein, without departing from the scope and spirit of the invention as set forth in the following claims.

What is claimed is:

1. A supersonic aircraft comprising:

a wing having upper and lower surfaces and extending from a leading edge to a trailing edge;

at least two engine nacelles coupled to the lower surface of the wing on the trailing edge;

an inverted V-tail coupled to the wing comprising a central vertical stabilizer, at least two inverted stabilizers coupled to sides of the central vertical stabilizer and coupled to the wing and supporting the at least two engine nacelles, and at least two ruddervators respectively pivotally coupled to the at least two inverted stabilizers; and a controller coupled to the at least two ruddervators capable of adjusting the aircraft longitudinal lift distribution throughout a flight envelope to maintain a reduced sonic boom and reduced drag trim condition.

2. The aircraft according to claim 1 wherein:

the ruddervators have sufficient torsional stiffness to reduce or minimize flutter resulting from ruddervator rotation coupling with V-tail bending and torsion.

3. The aircraft according to claim 1 wherein:

the controller controls asymmetric deflection of the ruddervators for roll control in synchronization with the rudder for directional control.

4. A supersonic aircraft comprising:

a wing having upper and lower surfaces and extending forward from a leading edge aft to a trailing edge;

an inverted V-tail coupled to the wing comprising a central vertical stabilizer with leading and trailing edges, and at least two inverted stabilizers coupled to sides of the central vertical stabilizer and coupled to the wing; and a rudder pivotally mounted on the trailing edge of the central vertical stabilizer, the rudder having a sufficient area and rudder control sizing to enable adequate yaw acceleration to achieve at least 8 degrees of yaw angle change within four seconds for decrab and a rudder actuator rate less than 60 degrees/second.

5. The aircraft according to claim 4 wherein:

the rudder has an area that is greater than 60% of the area of the central vertical stabilizer.

6. The aircraft according to claim 4 wherein:

the rudder has a sufficient area and rudder control sizing to counteract asymmetric engine thrust in the event of a single engine failure.

7. The aircraft according to claim 4 wherein:
the rudder has a sufficient area and rudder control sizing to attain a minimum control speed in air (Vmca) of approximately 165 knots, the Vmca being the speed at which the rudder is adequate to counteract asymmetric engine thrust with a bank angle less than or equal to 5 degrees.

8. The aircraft according to claim 4 further comprising:
at least two engine nacelles coupled to the lower surface of the wing on the trailing edge; and
controller coupled to the at least two ruddervators capable of adjusting yaw axis using sideslip command control law and roll axis using sideslip command control law, in the yaw axis pilot pedal input being interpreted as sideslip angle demand and pilot roll stick input being interpreted as roll rate demand.

9. The aircraft according to claim 4 wherein:
the rudder is sufficiently large and the inverted V-tail is configured sufficiently aft to attain rudder yaw control for single engine failures.

10. The aircraft according to claim 4 further comprising:
a fuselage abutting to the wing and extending forward and aft along a longitudinal axis, the aft portion of the fuselage forming a fuselage tail segment; wherein:
the rudder is merged with the fuselage tail segment so that the rudder and tail cone rotate pivotally with respect to the central vertical stabilizer and the fuselage.

11. A supersonic aircraft comprising:
a fuselage extending forward and aft about a longitudinal axis, the fuselage having upper and lower surfaces, the lower surface having a general axial curvature about the longitudinal axis and a local aft flattening;
a wing coupled inboard to the fuselage and extending outboard, and having a forward leading edge to an aft trailing edge;
an inverted V-tail coupled to the wing and fuselage comprising a central vertical stabilizer, at least two inverted stabilizers coupled to sides of the central vertical stabilizer and to the wing outboard of the fuselage; and
a strake coupled to and extending from the central vertical stabilizer through the fuselage interior and coupling to the lower fuselage surface at the position of local aft flattening, the flattened fuselage for lateral stiffening of the aircraft structure.

12. The aircraft according to claim 11 wherein:
the inverted V-tail is integrated into the wing trailing edge, the wing having a gull or dihedral inboard of the couplings of the inverted stabilizers to the wing, the dihedral being sufficient to increase take-off roll at the fuselage tip and to extend lifting length and reduce sonic boom effects.

13. The aircraft according to claim 11 further comprising:
at least two engine nacelles coupled beneath the wing at the wing trailing edge;
two main landing gear coupled to a lower surface of the wing respectively inboard of the at least two engine nacelles and capable of retraction into the wing and fuselage; and
a wing inboard portion configured to integrate with the nacelle and forming a dihedral gull that enhances low-sonic-boom signature by vertically staggering longitudinal lift distribution, the dihedral gull being formed by twisting and cambering the wing for low sonic boom and low induced drag while preserving a tailored local wing contour at a location of main landing gear retraction.

14. The aircraft according to claim 13 further comprising:
a Krueger flap coupled to the leading edge of the wing wherein:
the wing leading edge is sufficiently straight to accommodate a simple hinge line for the Krueger flap, and the inboard wing integrates with the engine nacelles and follows the low sonic boom fuselage contour with a sufficiently normal configuration to attain low interference drag, the wing having an inboard flap hinge line fully contained within the wing contour with wing upper and lower surfaces being essentially planar.

15. A supersonic aircraft comprising:
a wing having upper and lower surfaces and extending from a leading edge to a trailing edge;
at least two engine nacelles coupled to the lower surface of the wing on the trailing edge;
an inverted V-tail coupled to the wing comprising a central vertical stabilizer, at least two inverted stabilizers coupled to sides of the central vertical stabilizer and coupled to the wing and supporting the at least two engine nacelles; and
at least two wing structural support members coupled to the upper surface of the wing generally overlying the at least two engine nacelles, the wing structural support members coupling between the inverted stabilizers and the wing and extending from the wing trailing edge forward, the structural support members adding support to assist carrying engine nacelles weight.

16. The aircraft according to claim 15 wherein:
the inverted V-tail is integrated into the wing trailing edge, the wing having a gull or dihedral inboard of the engine nacelles, the dihedral being sufficient to increase take-off roll at the fuselage tip and to extend lifting length and reduce sonic boom effects.

17. The aircraft according to claim 15 further comprising:
two main landing gear coupled to a lower surface of the wing respectively inboard of the at least two engine nacelles and capable of retraction into the wing; and
a wing inboard portion configured to integrate with the nacelle and forming a dihedral gull that enhances low-sonic-boom signature by vertically staggering wing longitudinal lift distribution, the dihedral gull being formed by twisting and cambering the wing for low sonic boom and low induced drag while preserving a tailored local wing contour at a location of main landing gear retraction.

18. The aircraft according to claim 17 further comprising:
a Krueger flap coupled to the leading edge of the wing wherein:
the wing leading edge is sufficiently straight to accommodate a simple hinge line for the Krueger flap, and the inboard wing integrates with the engine nacelles and follows the low sonic boom wing contour with a sufficiently normal configuration to attain low interference drag, the wing having an inboard flap hinge line fully contained within the wing contour with wing upper and lower surfaces being essentially planar.

19. The aircraft according to claim 15 further comprising:
at least one wing rib within the wing and capable of supporting the wing structural support members and reduce and/or eliminate nacelle structural torsion, the wing structural support members adding volume that integrates with a lowest far-field wave drag penalty and blends, as a fillet, with the inverted V-tail.

20. The aircraft according to claim 15 further comprising:
a diverter coupling an engine nacelle to a wing, the diverter having a swept leading edge;
a pair of ribs extending through the wing and diverter, the ribs supporting the engine nacelle, the ribs being closely spaced and including a first rib approximately aligned with the center of the nacelle and a second rib outboard of the first rib in a range of locations from the first rib approximately to the outboard edge of the engine nacelle, wherein:
the structural support member extends essentially between the first and second spar and extends vertically upward to the inverted stabilizer to add volume for strength while wrapping about the connection of the wing and inverted stabilizer as an aerodynamic fairing with a minimal drag penalty.

* * * * *